(12) United States Patent
Yoshida et al.

(10) Patent No.: US 9,780,589 B2
(45) Date of Patent: Oct. 3, 2017

(54) ELECTRIC POWER CONTROL SYSTEM

(71) Applicants: Masaaki Yoshida, Kanagawa (JP); Masami Takai, Tokyo (JP)

(72) Inventors: Masaaki Yoshida, Kanagawa (JP); Masami Takai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 587 days.

(21) Appl. No.: 14/478,000

(22) Filed: Sep. 5, 2014

(65) Prior Publication Data

US 2015/0073614 A1    Mar. 12, 2015

(30) Foreign Application Priority Data

Sep. 11, 2013  (JP) .................. 2013-188628

(51) Int. Cl.

| G05D 17/00 | (2006.01) |
|---|---|
| H02J 7/00 | (2006.01) |
| G05B 15/02 | (2006.01) |
| H02J 3/14 | (2006.01) |
| H02J 9/00 | (2006.01) |

(52) U.S. Cl.
CPC ............ *H02J 7/0068* (2013.01); *G05B 15/02* (2013.01); *H02J 3/14* (2013.01); *H02J 9/005* (2013.01); *H02J 2003/143* (2013.01); *Y02B 70/3225* (2013.01); *Y02B 70/3233* (2013.01); *Y02B 70/3266* (2013.01); *Y04S 20/222* (2013.01); *Y04S 20/225* (2013.01); *Y04S 20/242* (2013.01); *Y10T 307/336* (2015.04)

(58) Field of Classification Search
CPC ..................................................... H02J 7/0068
See application file for complete search history.

(56) References Cited

U.S. PATENT DOCUMENTS

| 9,647,494 B2* | 5/2017 | Hui .................... H02J 9/061 |
|---|---|---|
| 2007/0188137 A1* | 8/2007 | Scheucher ............... H02J 1/10 320/116 |
| 2010/0289333 A1* | 11/2010 | Gilpatrick ................ H02J 3/14 307/39 |

(Continued)

FOREIGN PATENT DOCUMENTS

| DE | 20219737 U1 | 3/2003 |
|---|---|---|
| EP | 1271745 | 1/2003 |

(Continued)

OTHER PUBLICATIONS

Extended European Search Report dated Jun. 3, 2015.

*Primary Examiner* — Philip Wang
(74) *Attorney, Agent, or Firm* — IPUSA, PLLC

(57) ABSTRACT

An electrical equipment is supplied with electric power from one of an electric power supply system and a secondary battery. The electrical equipment includes a switch circuit and a module. The switching circuit switches a power supply source for supplying electric power to the electrical equipment between the electric power supply system and the secondary battery. The module includes a processor to execute a program to perform a controlling process including a process of controlling the switch circuit to selectively connect the electrical equipment to one of the electric power supply system and the secondary battery according to a control signal supplied from an external device.

11 Claims, 21 Drawing Sheets

(56) References Cited

U.S. PATENT DOCUMENTS

| | | | | |
|---|---|---|---|---|
| 2011/0121654 A1* | 5/2011 | Recker | ............... | H02J 9/065 |
| | | | | 307/66 |
| 2011/0181206 A1* | 7/2011 | Liess | ............... | H02J 9/065 |
| | | | | 315/307 |
| 2012/0311363 A1* | 12/2012 | Kim | ............... | G06F 1/266 |
| | | | | 713/323 |
| 2014/0183954 A1 | 7/2014 | Yoshida et al. | | |

FOREIGN PATENT DOCUMENTS

| | | |
|---|---|---|
| EP | 2226915 | 9/2010 |
| JP | 2004-360925 | 12/2004 |

* cited by examiner

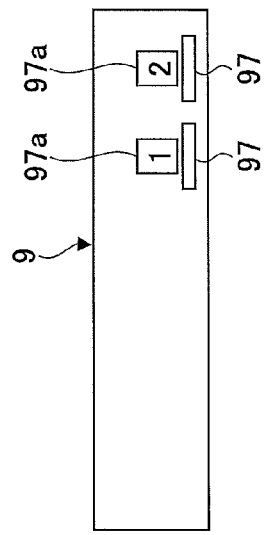
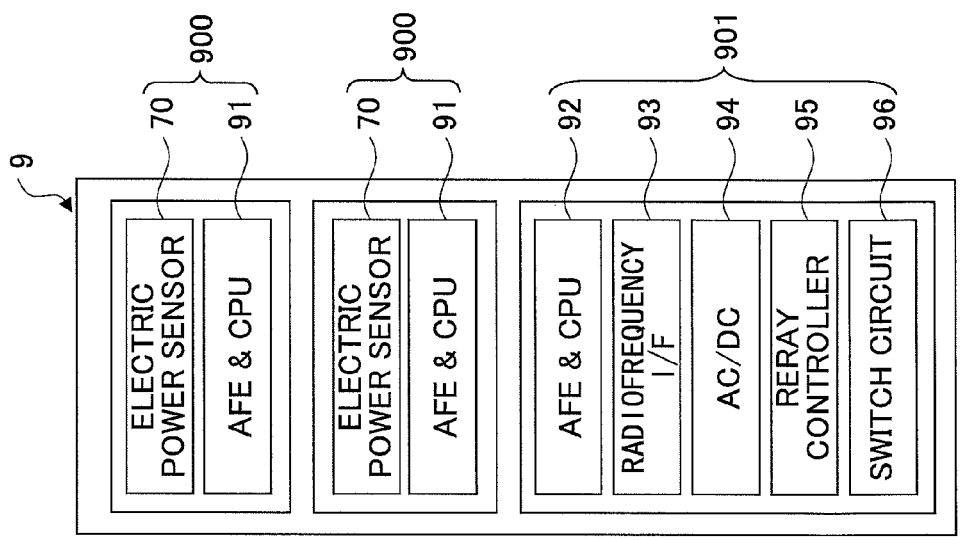
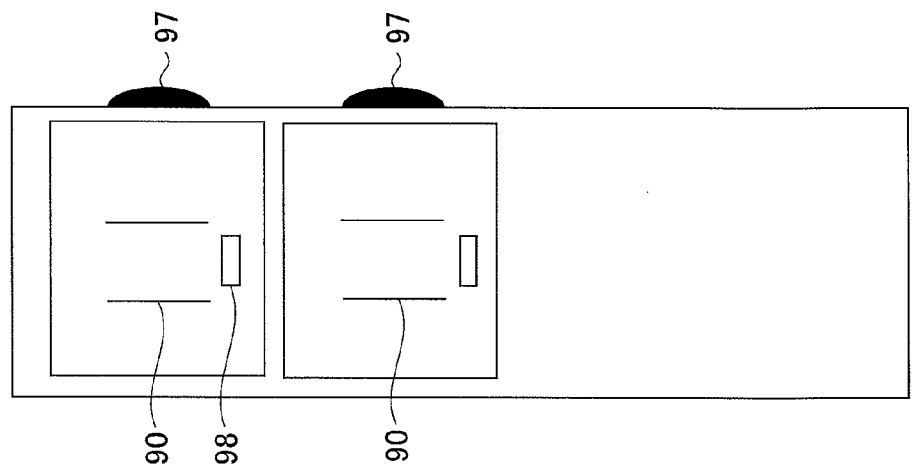

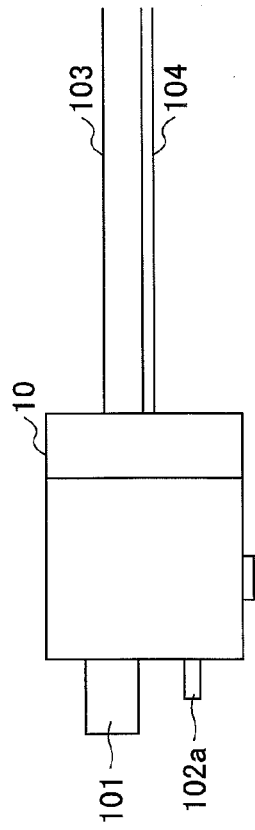
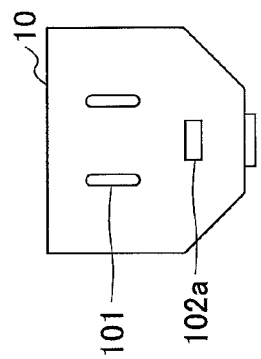
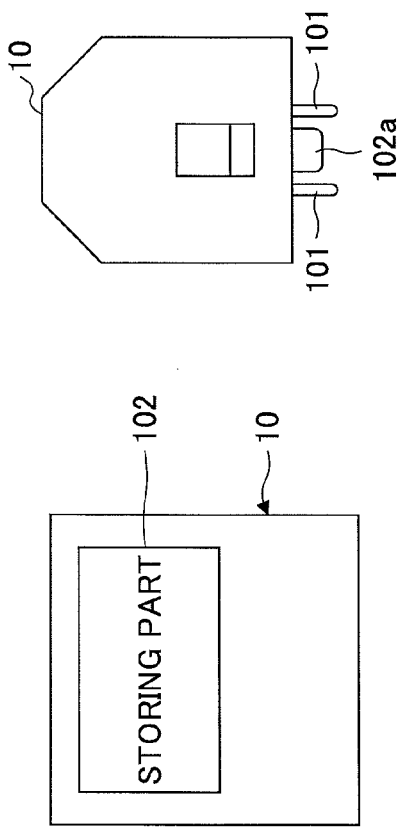

ELECTRIC POWER CONTROL SYSTEM

CROSS-REFERENCE TO RELATED APPLICATION

The present application is based upon and claims the benefit of priority of Japanese Patent Application No. 2013-188628, filed on Sep. 11, 2013, the entire contents of which are incorporated herein by reference.

BACKGROUND OF THE INVENTION

1. Field of the Invention

The present invention generally relates to an electrical equipment and an electric power control system using a secondary battery.

2. Description of the Related Art

In recent years, a demand for power-saving has increased to solve environmental problems. It is considered as one of measures for solving the environmental problems to forcibly restrict electric power supply by an electric power supplier.

In order to materialize such a power-saving scheme, air-conditioners and OA (Office Automation) devices provided with an electric power saving function have been commercialized. For example, there is an air-conditioner that automatically sets a so-called power-saving mode in which the air-conditioner is intermittently operated, when temperature and humidity reach predetermined setting values. In such an air-conditioner or OA device, a power-saving control is performed based on a setting value set for each device and a use condition of each device, and is performed under an individual control.

Moreover, there is suggested a system in which electric power sensors are provided to a house, an office, a plant, etc., to achieve so-called electric power visualization so as to improve power-saving awareness for people.

For example, Japanese Laid-Open Patent Application No. 2004-360925 discloses a power-saving control system that improves a power-saving efficiency. In the power-saving control system, illumination devices, air-conditioners and OA devices are integrally controlled based on detection data output from a first sensor for controlling the illumination devices, a second sensor for controlling the air-conditioners and a third sensor for controlling the OA devices.

The above-mentioned power-saving control system uses only one electric power supply system. Accordingly, this system cannot appropriately respond to a situation where the above-mentioned forcible power restriction or power stop occurs.

Moreover, the above-mentioned power-saving control system is capable of reducing a contract amount of electricity or a demand value (an average amount of electric power used for 30 minutes) if the energy-saving is progressed by the power-saving control system. However, this system does not provide a method or means for responding to a case where an actual amount of use of electricity exceeds a reduced contract amount of electricity or a reduced demand value. Therefore, it may be difficult for this system to achieve an effective power-saving control.

SUMMARY OF THE INVENTION

There is provided according to an aspect of the present invention an electrical equipment configured to be supplied with electric power from one of an electric power supply system and a secondary battery, the electrical equipment including: a switch circuit that switches a power supply source for supplying electric power to the electrical equipment between the electric power supply system and the secondary battery; and a module including a processor to execute a program to perform a controlling process including a process of controlling the switching circuit to selectively connect the electrical equipment to one of the electric power supply system and the secondary battery according to a control signal supplied from an external device.

There is provided according to another aspect of the present invention an electric power control system including: the electrical equipment; an electric power supplying part including the electric power supply system and the secondary battery; a plurality of electric devices that receive electric power from the electric power supplying part, the electric equipment serving as one of the electric devices; an environment sensor that detects physical amounts representing a condition of an environment of the electric power control system and outputs detection data; and an electric power control device that controls electric power supplied to the electric devices, wherein the electric power control device includes a computer that executes a program to perform an electric power controlling process including: collecting the detection data from the electric power sensor and the environment sensor and storing the collected detection data in a detection data storing part; storing control condition data in an electric power condition data storing part, the control condition data including information regarding a contract amount of electric power previously set and information regarding an accumulated amount of power consumption; storing control device data in a control target device data storing part, the control device data including device identification information for identifying each of the electric devices and priority order identification information for identifying a priority order given to each of the electric devices; determining which one of the electric power control system and the secondary battery is to supply electric power to the electric devices on an individual device basis based on information including the detection data, the control condition data and the control device data, and also determining an amount of electric power to be supplied to the electric devices on an individual device basis or determining whether to stop supplying electric power to the electric devices on an individual device basis; and sending an instruction to each of the modules to control corresponding one of the switch circuits in accordance with results of the aforementioned determinations.

Other objects, features and advantages of the present invention will become more apparent from the following detailed description when read in conjunction with the accompanying drawings.

The objects and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 5A is a plan view of an intelligent tap;

FIG. 5B is a block diagram of a functional structure of the intelligent tap;

FIG. 5C is an front view of the intelligent tap;

FIG. 6A is a plan view of a power supply plug to be connected to the intelligent tap;

FIG. 6B is a front view of the intelligent tap;

FIG. 6C is a side view of the intelligent tap;

FIG. 6D is an illustration of the intelligent tap;

DETAILED DESCRIPTION OF THE EMBODIMENTS

Figure 1:
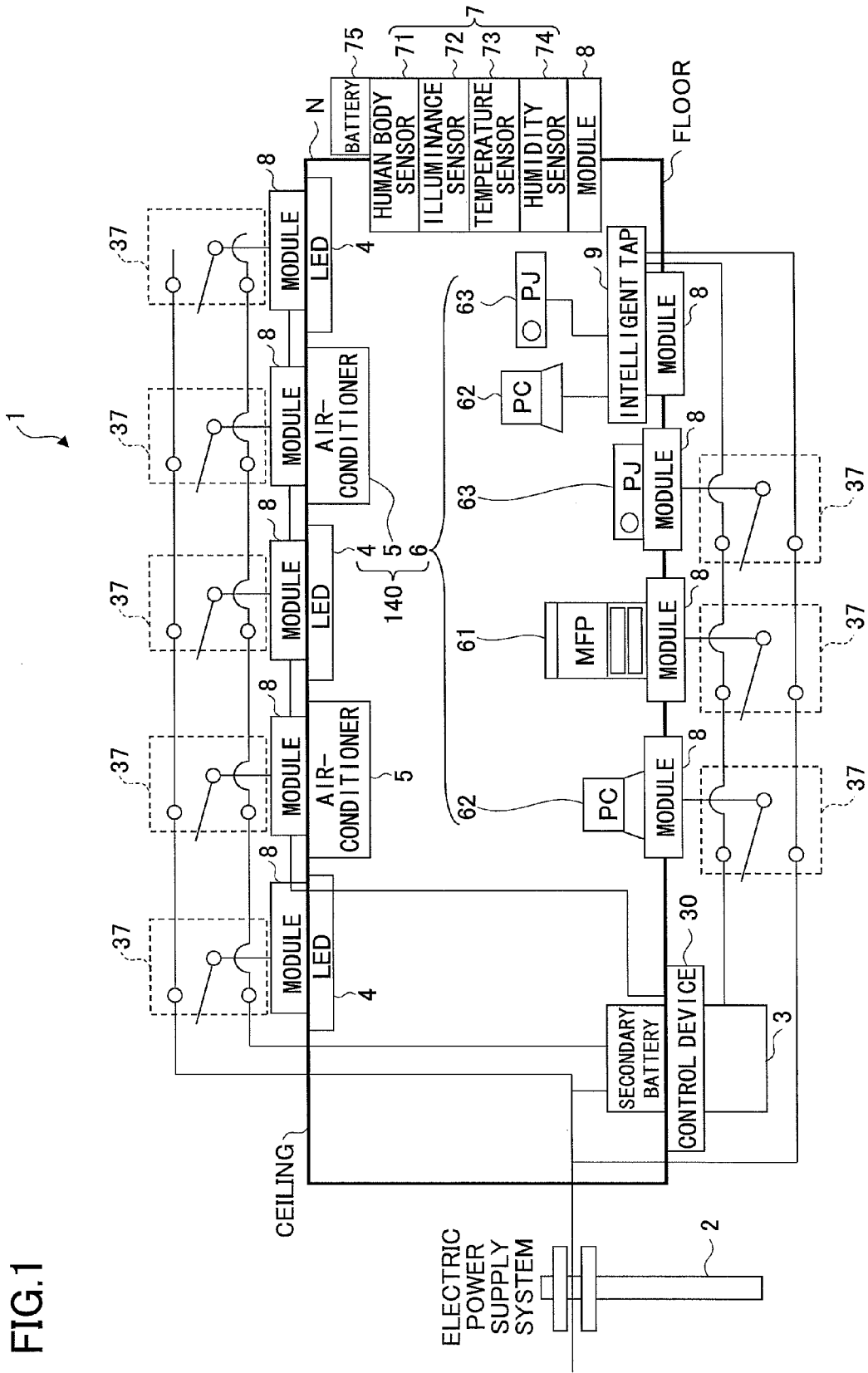
FIG. 1 is a diagram of an entire structure of an electric power control system according to a first embodiment.

A description will now be given, with reference to the drawings, of embodiments of the present invention.

An electric power control system according an embodiment of the present invention is provided to a house, an office, a plant, etc., having a power supply system for supplying electricity and at least one secondary battery for supplying electricity.

In the following description and the attached drawings, equivalent members and parts are given the same reference numerals, and duplicate explanations will be omitted. Additionally, the drawings do not indicate a relative ratio between the members and parts, and specific dimensions and sizes of the members and parts can be determined by a person skilled in the art in light of the non-limiting embodiments mentioned below.

First Embodiment

A description will be given, with reference to the drawings, of an electric power control system according to a first embodiment of the present invention.

Figure 2:
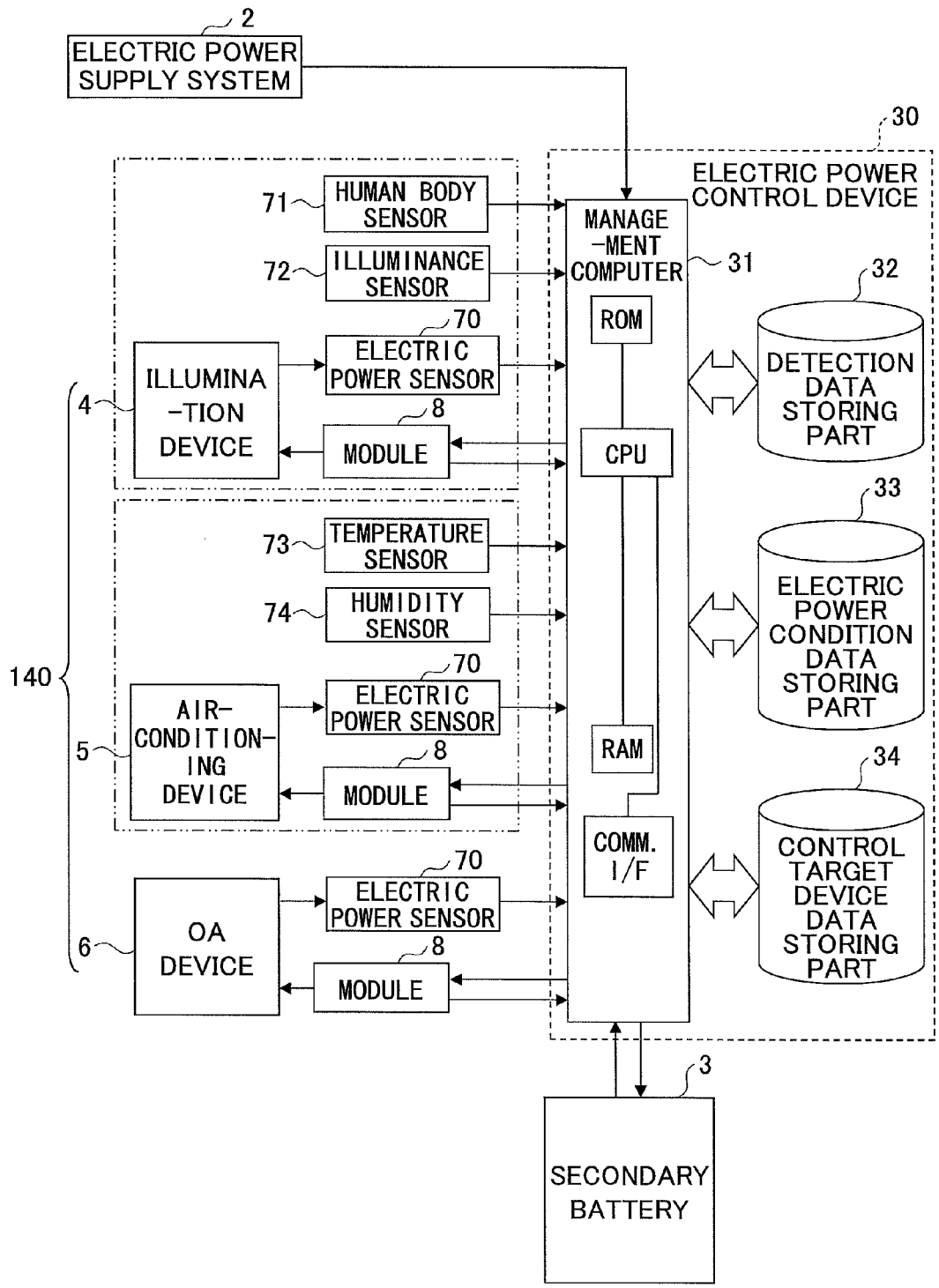
FIG. 2 is a block diagram of the electric power control system.

First, a description is given, with reference to FIGS. 1 and 2, of an entire structure of the electric power control system 1, which uses a secondary battery, according to the first embodiment.

As illustrated in FIG. 1, the electric power control system 1 includes an electric power supply system 2 and a secondary battery 3 as an electric power supplying part for supplying electricity to, for example, an office building. A plurality of the secondary batteries 3 may be provided in the electric power control system 1. Although not illustrated in the figures, the electric power supply system 2 includes a wiring board, which is an electric power receiving terminal, and a distribution board.

1. The electric power control system 1 (hereinafter, may be referred to as the "power control system 1") includes a plurality of electric devices 140, each of which receives electricity from the electric power supplying part. The electric devices 140 includes, for example, an illumination equipment or device 4, an air-conditioning equipment or device 5, and an office equipment or device 6 (hereinafter, referred to as the "OA device 6"). The illumination equipment or device 4 is, for example, an LED lamp or light (hereinafter, may be referred to as the "LED lamp 4"). The air-conditioning equipment or device 5 is, for example, an air-conditioner. The office equipment 6 includes, for example, an MFP (multi-function peripheral) 61, a personal computer 62, a projector 63, etc. Each of the electric devices 140 including the illumination equipment 4, the air-conditioning equipment 5 and the OA device 6 is preferably provided with an electric power sensor (hereinafter, may be referred to as the "power sensor 7") as illustrated in FIG. 2. Additionally, each of the electric devices 140 including the illumination equipment 4, the air-conditioning equipment 5 and the OA device 6 is preferably provided with an electric power supply common module (hereinafter may be simply referred to as the "common module 8" or the "module 8"), which is mentioned later in detail. In the figures, the electric power supply common module 8 is simply represented as "module". The common module 8 is preferably incorporated in an intelligent-type power strip 9 (hereinafter referred to as the "intelligent tap 9"), which is a block of electrical sockets that attaches to the end of a flexible cable and allows multiple electrical devices to be plugged in. The intelligent tap 9 is an electrical equipment which generally has a plurality of receptacles into which plugs of electric devices can be inserted. The intelligent tap can be installed or placed near the electric devices 140 so as to supply electricity to the electric devices 140. The intelligent tap 9 has a function of controlling the power supply to the electric devices 140 as mentioned later.

The electric devices 140 may include an electronic blackboard, an electric tea pot, an electric coffee pot, etc. Each of the electric devices 140 is not necessarily mounted with the power supply common module 8.

The electric power control system 1 preferably includes environment detectors 7. The environment detectors 7 include various sensors such as, for example, a human body sensor 71, an illuminance sensor 72, a temperature sensor 73, a humidity sensor 74, etc., which are necessary for an electric power supply control. For example, a $CO_2$ sensor may be used as one of the environment detectors 7. Each of the environment detectors 7 is preferably provided with the common module 8.

The human body sensor 71 detects existence of a person in an office or the like by detecting an infrared ray emitted from a human body. The illuminance sensor 72 detects an illuminance inside an office or the like. The temperature sensor 73 detects a temperature inside an office or the like. The humidity sensor 74 detects humidity in an office or the like. Each of the environment detectors 7 preferably receives electricity supplied from a harvesting system and stores the received electricity in a battery 75. The harvesting system is a system according to an environment generating technology to generate electricity by acquiring (harvesting) a minute energy from a surrounding environment such as a motion of a person and object (vibration, heat), a light, a radio-wave, a temperature, etc. Although the acquired electric power is as small as several microwatts (μW) to several tens milliwatts (mW), such a generating device according to the environment generating technology is excellent in portability, and does not require charge and battery replacement. Additionally, the generating device does not discharge $CO_2$. Of course, the environment detectors 7 may be supplied with electricity from the electric power supply system 2.

The electric power control system 1 includes an electric power control device 30 that controls supply of electricity to the electric devices 140 using detection data from the environment detectors 7 and the electric power sensor 70.

The electric power control device 30 is connected to each of the electric devices 14, the environment detectors 7 and the electric power sensor 70 via a network N so that the electric power control system 1 is capable of exchanging information with these devices and sensors.

Figure 3:
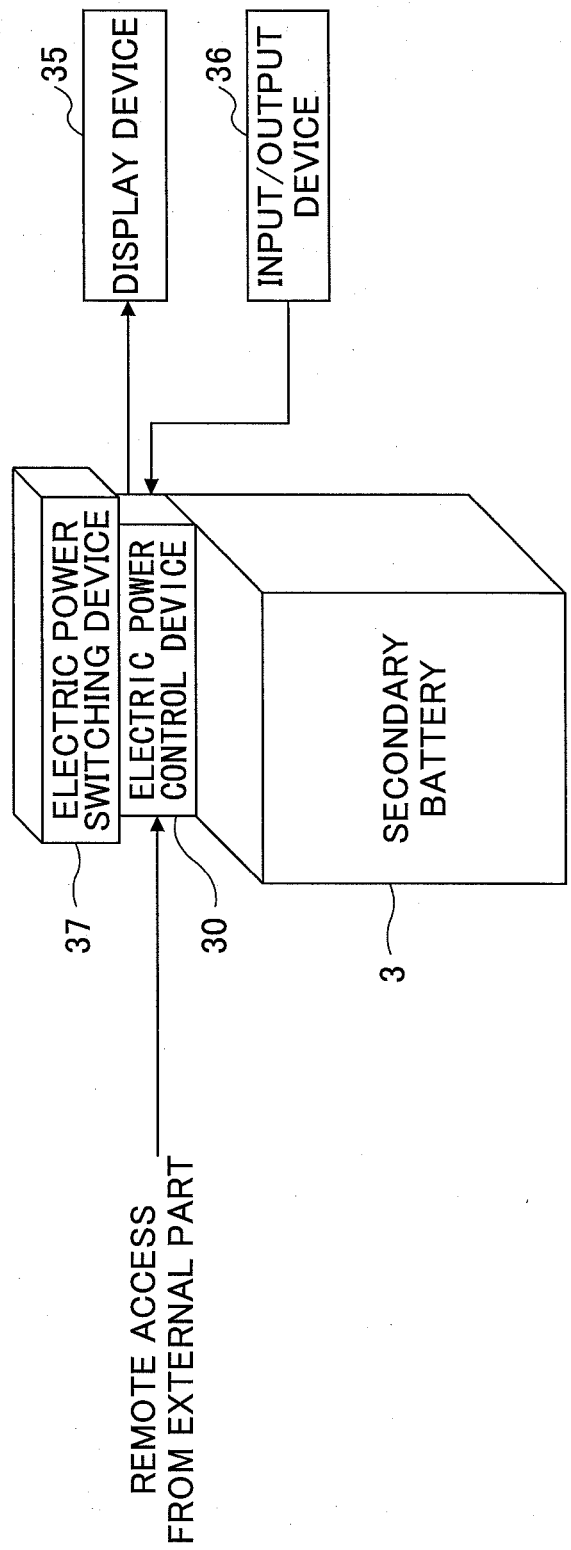
FIG. 3 is an illustration of an outline structure of the secondary battery.

The secondary battery 3 is provided with the electric power control device 30 as illustrated in FIG. 3. Although the secondary battery 3 is illustrated as being separated by the electric power control device 30 into an upper portion and a lower portion in FIG. 3, the electric power control device 3 is attached to a side of the secondary battery 3 and does not divide the secondary battery 3. The secondary battery 3 includes an electric power switching device 37 that switches a supply source of electricity to the electric devices 140 between the electric power supply system 2 and the secondary battery 3 on an individual electric device basis. Additionally, the electric power control device 30 is provided with a display device 35 such as an LCD (Liquid Crystal Display). Information regarding an electric power control such as, for example, a remaining amount of battery power, a use condition and a usable time of each of the electric devices 140 may be preferably displayed on the display device 35. Moreover, the electric power control device 30 may be provided with an input/output device 36 such as, for example, a keyboard, a printer, etc. The input/output device 36 is capable of rewriting data and programs stored in the electric power control device 30 and outputting the data and programs to external devices. The input/output device 37 is equipped with a remote access device with which data and programs sent from external devices are rewritable. Such a remote access is made in a case of accessing a management computer 31 via the Internet though, for example, a smartphone.

A description is given below, with reference FIG. 2, of a structure of the electric power control device 30.

The electric power control device 30 includes the management computer 31 as an example of a power controlling means, a detection data storing part 32, an electric power condition data storing part 33 and a control target device data storing part 34 as an example of a control device data storing means. The management computer 31 has functions of a recording means, a controlling means including a means relating to an electric power control, a power computing means and a notifying means. A processor such as a CPU provided in the management computer 31 performs a process mentioned later by executing a power control program stored in a ROM. The management computer 31 controls each of the illumination device 4, the air-conditioning device 5 and the OA device 6 according to the process mentioned later. The management computer 31 also includes a communication interface (I/F) to receive detection signals from the environment detectors 7 and the common module 8 (including the intelligent tap 9) and transmit control signals regarding the electric power control in order to perform various processes.

Moreover, the management computer 31 is connected with each of the data storing parts 32, 33 and 34 so as to acquire data stored in the data storing parts 32, 33 and 34 when performing various processes. For example, the management computer 31 performs a process of computing a usable time when each electric device 140 is continuously used and displaying the computed usable time on the display device 35. Such a display is preferably performed especially when it is determined that a power supply from the electric power supply system 2 is interrupted.

The detection data storing part 32 stores detection data regarding a detection result of each of the environment detectors 7 and the electric power sensors 70 incorporated in the respective common modules 8. The detection data contains, for example, data regarding a sensor identifier, a detection time and a detection result. Here, the sensor identifier is used to identify each of the sensors 70 to 74. Different sensor identifiers are assigned to a plurality of sensors of the same kind, respectively. The detection data is data indicating a result of detection acquired by each of the environment detectors 7 and the electric power sensors 70.

The electric power condition data storing part 33 stores previously determined control condition data. The control condition data is, for example, information regarding a demand value, a contract amount of electric power, an amount of power consumption, a total amount of power consumption and a remaining amount of battery power, information regarding planned power outage, and information regarding electricity interruption from the electric power supply system 2.

The demand value indicates an amount of power consumption in a time span during which a maximum amount of electric power is consumed when viewing a temporal transmission of an amount of power consumption on a monthly or yearly basis.

The contracted amount of power consumption is a value of an amount of power consumption contracted with a power company. The total amount of power consumption is a value obtained by simply summing amounts of power consumed in each period such as one day, one week or one month. In this connection, previous data such as, for example, the total amount of power consumption for a past one week is recorded.

The information regarding planned power outage is data regarding time and date of carrying out a power outage when the power outage is announced previously. The information regarding interruption of power supply from a power system is power interruption information previously announced by a power company, and is data regarding time and date of interrupting power supply. Additionally, the power interruption information may include information regarding a demand response, which has been promoted in recent years. The demand response is a system to promote suppression of power consumption and attempt cooperation of supply and reception of electric power by a supplier setting various charge setting in controlling supply and reception of electricity such as, for example, increasing an electricity charge for a peak time and paying an incentive to appropriate power saving. Accordingly, by performing a control responding to the demand response information, a more effective power saving including cost saving can be achieved.

The control target device data storing part 34 stores control device data. The control device data includes, for example, device identification information for identifying each of the electric devices 140 and priority order information for identifying a priority order of controlling the power supply to the electric devices 140.

The device identification information includes identifiers for identifying each of the plurality of illumination devices 4, a plurality of air-conditioning devices 5 and a plurality of OA devices 6 (MPFs 61, personal computers 62 and projectors 63) that are controlling targets. Additionally, the device identification information preferably includes information regarding properties of electric devices such as power consumption and maximum rating of each device.

The priority order information includes flag information regarding a condition of controlling power supply. Especially, the priority order information is used when electric power consumption becomes equal to or exceeds a power reference value or it is necessary to temporarily reduce a power supply amount. The priority order information is set in four steps, "A" and "1" to "3" in the present embodiment so that electric power is supplied preferentially if the priority order flag is a numerical value and the value is smaller, and an electric power supplied is restricted if the value is larger.

An electric device given the priority order flag being set to "A" is a device set in an automatic mode according to which the electric device is mandatorily controlled by the electric power control of the electric power control device 30. Accordingly, the priority order flag "A" is set to an electric device to which a power can be supplied appropriately in conformity with a current condition. The priority order "1" indicates to supply an electric power always preferentially. The priority order "2" indicates to supply an electric power only at a normal time or a power reducing time, and to stop an electric power supply when an interruption of power supply from the electric power supply system 2 occurs. The priority order "3" indicates to supply an electric power only at a normal time, and to permit an electric power supply to stop at a power reducing time.

In the present embodiment, a priority order (flag) is previously given to each of the electric devices 140. The priority order can be changed by using the input/output device 36 of the electric power control system 1. Additionally, as mentioned later, a user can manually change the priority order by operating priority order setting parts 97 provided in the intelligent tap 9.

In the present embodiment, an appropriate priority order (flag) is set to each of the illumination devices 4, the air-conditioning devices 5 and the OA devices 6 and the electric power control is performed on an individual device basis. Accordingly, an optimum electric power control can be achieved more effectively without failing a comfort of individuals as compared to a power saving method in which a priority is simply given to, for example, all of the air-conditioning devices 5 when a power supply to some of the devices is to be stopped.

The control target device data storing part 34 also stores information regarding which electric power supply part is to be connected to each of the electric devices 140. Each of the electric devices 140 illustrated in FIGS. 1 and 2 is provided with an electric power supplying means, which is connectable to either one of the electric power supply system 2 and the secondary battery 3. However, there may be a case where an electric power supplying means is not provided because the electric power supplying means may be provided in the intelligent tap 9 or the illumination device 4 as mentioned later.

A description will now be given, with reference to FIG. 4A, of the electric power supply common module 8 incorporated in each of the electric devices 140.

Figure 4A:
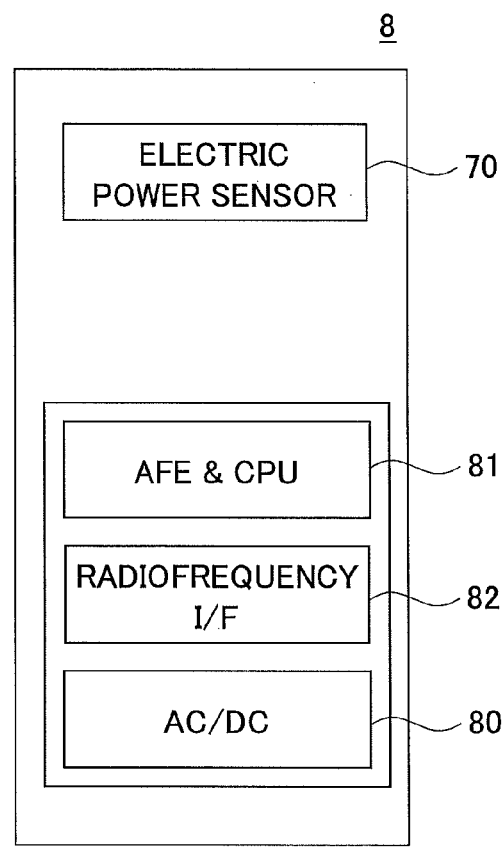
FIG. 4A is a block diagram of a power supply common module.
Figure 4B:
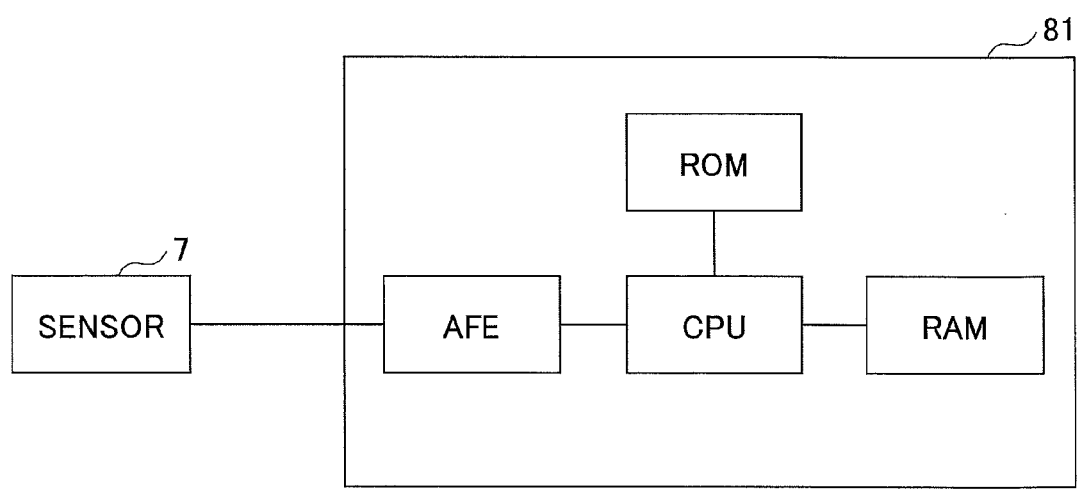
FIG. 4B is a block diagram of an AFE&CPU provided in the power supply common module.

As illustrated in FIG. 4A, the electric power supply common module 8 includes the electric power sensor 70, an AC/DC converter (direct current stabilizing power supply) 80, an AFE&CPU 81 and a radiofrequency I/F 82. AFE (Analog Front End) is an analog circuit for connecting a sensor to a digital signal processing device such as a microcomputer including a CPU (Central Processing Unit). The CPU of the AFE&CPU 81 serves as a controlling means for controlling a supply of electric power to a target electric device. The AFE&CPU 81 is generally configured by a microcomputer including a CPU, a ROM, a RAM, etc., as illustrated in FIG. 4B. The radiofrequency I/F 82 is a communication interface, which preferably uses a radiofrequency communication protocol such as ZigBee to transmit data.

If the electric power supply common module 8 (control circuit) is incorporated in each of the electric devices 140, there is no need to construct a large-scale device control system, which requires a large scale construction in a house, an office building, a plant facility, etc. Additionally, the electric power control device 30 can be configured to be capable of adjusting an amount of electric supply for each of the electric devices 140, which contributes to an optimum power control which does not deteriorate a comfort of individuals. The electric power supply common module 8 may be incorporated into or attached to each of the electric devices 140.

The electric power supply common module 8 may be incorporated into the intelligent tap 9, which is a example of a power supply tap illustrated in FIGS. 5A to 5C.

The intelligent tap 9 includes one or more power supply sockets (receptacles) 90. The intelligent tap 9 is configured to collectively perform power supply controls for a plurality of electric devices 140 connected to the power supply sockets 90. The power supply control described hereinafter includes a function to send information regarding power consumption of each of the connected electric devices to the electric power control device 30 and executes instructions sent from the electric power control device 30.

The intelligent tap 9 includes a sensor module 900, which includes the electric power sensor 70 and an AFE&CPU 91, for each of the power supply sockets 90. Additionally, the intelligent tap 9 is preferably configured to include an electric power supply common module 901, which includes an AFE&CPU 92, a radiofrequency I/F 93, an AC/DC converter 94, a relay controller 95 and a switch circuit 96. The switch circuit 96 is an example of a switching means for switching connection to the electric power supply part. It should be noted that the AFE&CPU 91 and the AFE&CPU 92 have the same configuration as the AFE&CPU 81 mentioned above.

The switch circuit 96 is a relay circuit (refer to FIG. 7) for switching the electric power supply part to which each of the sockets 90 is connected between the electric power supply system 2 and the secondary battery 3 in order to supply electric power from either one of the electric power supply system 2 and the secondary battery 3 to each of the electric devices connected to the power supply sockets 90 of the intelligent tap 90.

The intelligent tap 9 is connected with a plurality of electric devices such as, for example, the MFP 61, the personal computer 62 and the projector 63. The intelligent tap 9 reduces or cuts off a waiting time power consumption of each of the electric devices by operating the switch circuit 96 by a relay controller 95 according to an instruction or command sent from the AFE&CPU 92. Additionally, the intelligent tap 90 is capable of performing power supply control by the electric power control device 30 such as an ON/OFF switching control and a remote control of each device according to power measurement information of each device sent from each sensor module 900.

The intelligent tap 9 is provided with the priority order setting parts 97 as a priority order setting means for setting a priority for restriction of electric power supply by manual operation of a user. The priority order setting parts 97 provide an advantage in that an appropriate power supply control can be performed for each of the electric devices connected to the intelligent tap 9 in each situation, especially when the power supply by the electric power supply system 2 is interrupted or when a large restriction of electric power supply is required such as in a time of planned power outage.

In the present embodiment, each of the priority order setting parts 97 is a dial-type input part as illustrated in FIGS. 5A and 5C. It is preferable to display a priority order, which is set by the corresponding priority order setting part 97, on a display part 97a. If the priority order is set manually by a user, the radiofrequency I/F 93 of the electric power common module 901 transmits a change signal to the electric power control device 30. Then, the management computer 31 of the electric power control device 30 changes or rewrites the priority order information of the corresponding electric device stored in the control target device data storing part 34.

The representation of the priority order preferably includes, for example, the levels "A" and "1" to "3" as mentioned above, and a description of the priority order will be omitted.

The intelligent tap 9 preferably includes device recognizing parts 98 (refer to FIG. 5A) for recognizing each of the electric devices 140 connected to the intelligent tap 9. Each of the device recognizing parts 98 is provided at a corresponding one of the power supply sockets 90. That is, each of the device recognizing parts 98 is configured to acquire the device information according to the relationship with a connection plug (a power supply plug) of each of the electric devices illustrated in FIGS. 6A through 6D, which is inserted into and connected to one of the power supply sockets 90.

The connection plug 10 includes, as illustrated in FIG. 6A, a pair of plug blades 101 protruding from a body of the connection plug 10 and a storing part 102 provided inside the body of the connection plug 10. The storing part 102 stores the device identification information of the electric device, which receives electric power through the pair of plug blades 101 of each of the electric devices 140, and the priority order information of each of the electric devices 140. Additionally, as illustrated in FIG. 6C, a power cable 103 and a communication cable 104 extend from the body of the connection plug 10. The power cable 103 and the communication cable 104 are connected to the corresponding one of the electric devices 140.

The storing part 102 is a semiconductor memory or the like, and includes a USB terminal 102a (plug type). The USB terminal 102a is attached to the same surface of the body of the connection plug 10 as the surface from which the pair of plug blades 101 protrude.

On the other hand, the device recognizing terminal 98 has a USB terminal (socket type), which is connectable with the USB terminal of the storing part 102. When connecting the connection plug 10 to the intelligent tap 9, the plug blades 101 are inserted into the power supply socket 90 and the USB terminal 102a of the connection plug 10 is simultaneously inserted into the device recognition part 98 of the intelligent-type tap 90. Accordingly, after the intelligent tap 90 is connected to one of the electric devices 140 through connection plug 10, the device recognition terminal 98 of the intelligent tap 90 acquires the device identification information of the connected electric device stored in the storing part 102 of the connected electric device. Then, the intelligent-type tap 9 transmits the acquired device identification information of the connected electric device to the management computer 31 of the electric power control device 30 through the radiofrequency I/F 93. The management computer 31 stores the received identification information in the control target device data controlling part 34. Accordingly, the electric power control device 30 is capable of identifying the electric device connected to the intelligent-type tap 9.

The exchange of the device identification information mentioned above is not limited to the above-mentioned configuration. Each of the electric devices 140, which are not connected to the intelligent tap 9, may be configured to transit the device identification information to the electric power control device 30 (the management computer 31) by mounting a radiofrequency I/F beside the storing part 102 in the connection plug of the electric device. Alternatively, the device identification information may be transmitted to the electric power control device 30 (the management computer 31) through the communication cable 104.

Figure 7:
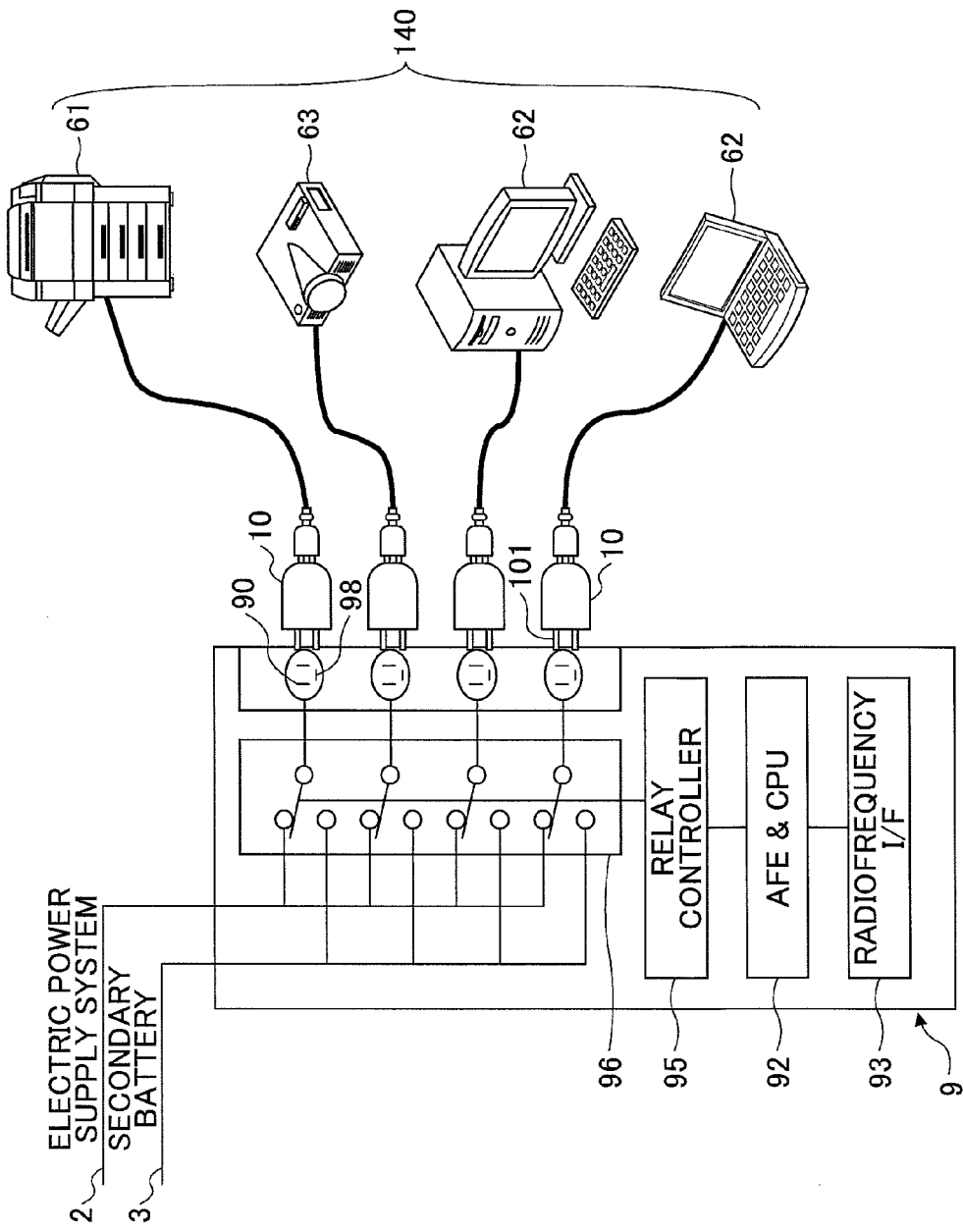
FIG. 7 is a block diagram of an electric circuit of the intelligent tap.

FIG. 7 illustrates a connection relationship between the intelligent tap 9, the connection plugs 10 and the electric devices 140. Although the MFP 61, the projector 63 and the two personal computers 62 are connected to the intelligent tap 9 in the example of FIG. 7, the electric devices 140 connected to the intelligent tap 9 are not limited to the MFP 61, the projector 63 and the two personal computers 62.

Each of the electric devices 140 is provided with the connection plug 10, which stores its own device identification, and the connection plug 10 is connected to one of the power supply sockets 90 of the intelligent tap 9. The intelligent tap 9 acquires the device identification information of the particular electric device 140 from the storing part 102 of the connection plug 10 of the particular electric device 140, and transmits the acquired identification information to the electric power control device 30 by the radiofrequency I/F 93.

The electric power control device 30 determines whether to connect each of the electric devices 140 connected to the intelligent tap 9 to the electric power supply system 2 or the secondary battery 3 on an individual device basis. The electric control device 30 determines an amount of electric power to be supplied or whether to stop the supply of electric power, and transmits a power control signal, which is information of a result of the determination, to the intelligent tap 9 through the communication I/F. Then, the power supply common module 901 of the intelligent tap 9 performs a power controlling process by the electric power control device 30. That is, the relay controller 95 controls the switch circuit 96 so that electric power is supplied from one of the electric power supply part determined by the electric power control device 30 to the corresponding electric device 140. The relay controller 95 is configured to be capable of controlling the switch circuit if the switch circuit is of a three-contact type.

The detection data output by the electric power sensor 70 of the sensor module 900 is transmitted by the radiofrequency I/F 93 to the electric power control device 30 as information indicating an amount of power consumption of each of the connected electric devices 140 which consume electric power to operate.

A description is given below, with reference to FIGS. 8A through 12B, of a configuration of the illumination device 4 according to the present embodiment. The illumination device 4 is an electrical equipment generally attached to a ceiling or a side wall of a room in order to illuminate inside the room.

Figure 8A:
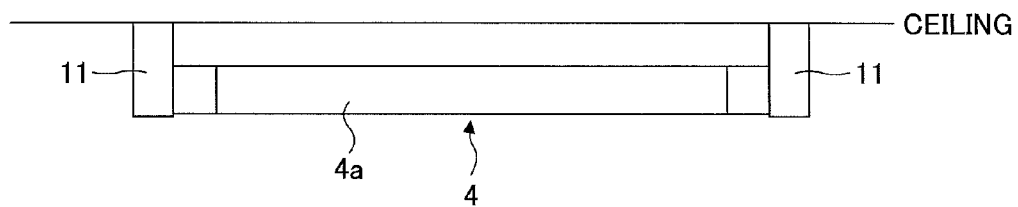
FIG. 8A is a side view of an example of an illumination device.
Figure 8B:
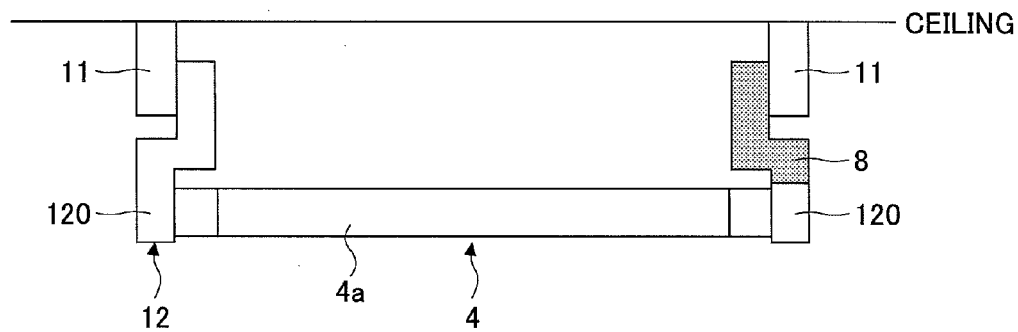
FIG. 8B is a side view of another example of the illumination device.

FIG. 8A illustrates a normal straight-tube type LED lamp as an example of the illumination device 4 attached to a ceiling. FIG. 8B illustrates a straight-tube type LED lamp as an example of the illumination device 4 according to the present embodiment. Hereinafter, the illumination device 4 according to the present embodiment may be referred to as the "LED lamp 4". Although the illumination device 4 according to the present embodiment may be a straight-tube type LED (Light Emitting Diode) lamp, which is directly attached to a ceiling as illustrated in FIGS. 8A and 8B, the illumination device 4 is not limited to such a straight-tube LED lamp directly attached to a ceiling.

The LED lamp 4 illustrated in FIG. 8B includes an externally-attaching adaptor 12 having a pair of adapter members 120, which are used to attach the LED tube 4a to a lamp holder including a pair of attachment members 11 attached to a ceiling. The attachment members 11 forming the lamp holder may be included in the LED lamp 4 serving as an electrical equipment. As illustrated in FIG. 8B, one of the adapter members 120 incorporates the electric power supply common module 8 therein.

In order to perform an electric power control for a plurality of the LED lamps 4 on an individual lamp basis, the electric power supply common module 8 is incorporated into each of the LED lamps 4. However, if LED lamps have already been installed, the installed LED lamps must be replaced by the LED lamps 4 in order to perform the electric power control according to the present embodiment, which requires additional investment costs. Thus, by using the LED lamp 4 including the adapter member 120 in which the electric power supply module 8 is incorporated, the electric power control system 1 effectively using the existing equipment can be materialized.

The externally-attaching adaptor 12 includes the pair of adaptor members 12 each of which is formed in a crank shape (bent into the shape of a crank). The above-mentioned common module 8 is incorporated in one of the adaptor members 120. Although not illustrated in the figures, each of the adaptor members 120 has two electricity receiving terminals on an outer surface of an upper portion, which are used to receive electricity from the corresponding attachment member 11, and two electricity supplying terminals on an outer surface of a lower portion, which are used to supply electricity to the LED tube 4a of the LED lamp 4.

Generally, a pair of attachment members 11, which support respective opposite ends of the straight-tube type LED tube 4a of the LED lamp 4, have already been attached to a ceiling. Each of the attachment members 11 is provided with two power-supply and support terminals on an inner surface facing an end of the LED tube 4a of the LED lamp 4 in order to support the LED tube 4a and supply electricity to the LED tube 4a.

The reception terminals of each of the adaptor members 120 of the externally-attaching adaptor 12 are attached to the power-supply and support terminals of a corresponding one of the attachment members 11. Then, the LED tube 4a is attached between the pair of adaptor members 120 by connecting the terminals of the opposite ends of the LED tube 4a to the power-supply and support terminals of the pair of the adaptor members 120, respectively. Thereby, the electric power supply common module 8 is incorporated in the LED lamp 4.

As mentioned above, it becomes possible to use a standard straight-tube type LED tube 4a for the LED lamp 4 according to the present embodiment because the electric power supply common module 8 is incorporated into the externally-attaching adaptor 12, thereby improving convenience of use. Moreover, a new construction due to introduction of the power supply control can be suppressed as small as possible. Furthermore, there is an advantage in that it is easy to return a building or a house to an owner thereof when a tenant of a building or a house is required to return the building or the house to the owner.

Figure 9:
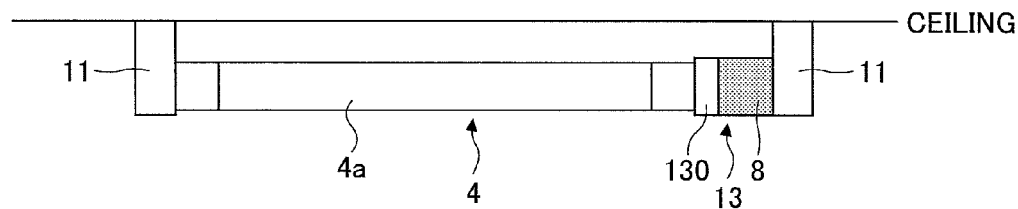
FIG. 9 is a side view of another example of the illumination device.

The LED lamp 4 may be configured to be attached to the attachment members 11 using an externally-attaching type adaptor 13 as illustrated in FIG. 9.

In the LED lamp 4 illustrated in FIG. 8A, the LED tube 4a protrudes downwardly unlike the normal LED lamp 4 illustrated in FIG. 8A because each of the adaptor members 120 of the externally-attaching adapter 12 has a crank shape so that a portion of the adaptor member 120 to which an end of the LED tube 4a is attached protrudes downward from the attachment member 11. In this respect, the externally-attaching adaptor 13 illustrated in FIG. 9 has a square cross-sectional shape of a size so that the adaptor 13 does not protrude from the attachment member 11 downwardly. In FIG. 9, the externally-attaching adaptor 13 is configured by a single support member 130, which is attached to one of the pair of the attachment members 11. However, two support members 130 may be provided to both of the attachment members 11, respectively.

The externally-attaching adaptor 13 has a reception terminal on an end thereof so that an end of the LED tube 4a is connected to the reception terminal. An attachment terminal is provided on the other end of the externally-attaching adaptor 13 so that the attachment terminal is connected to the power-supply and support terminal of the attachment member 11. The electric power supply module 8 is incorporated in the externally-attaching adaptor 13, and, thereby, the electric power supply module 8 can be incorporated in the LED lamp 4 as an electrical equipment.

Figure 10:
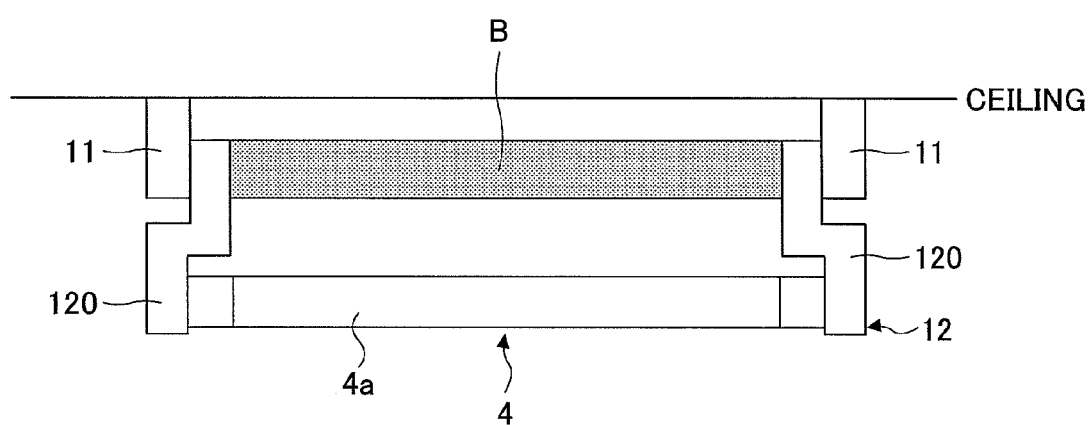
FIG. 10 is a side view of another example of the illumination device.

As illustrated in FIG. 10, the LED lamp 4 may include the externally-attaching adapter 12 having a pair of the crank shaped adaptor members 120 and a battery B located between the adaptor members 120.

Because the externally-attaching adapter 12 has a pair of the crank shaped adaptor members 120 as illustrated in FIG. 8B, the LED tube 4a is placed at a lower position than a normal position illustrated in FIG. 8A. Accordingly, an empty space is formed between the LED tube 4a and the ceiling as illustrated in FIG. 8B. The battery B is placed in the space between the LED tube 4a and the ceiling as illustrated in FIG. 10 so that the LED lamp 4 can be activated by an electric power supplied from the battery B. That is, the LED lamp 4 can be activated without receiving electricity from the electric power supply system 2 or the secondary battery 3 especially in case of emergency. Accordingly, by incorporating the battery B in the LED lamp 4, the priority order of the LED lamp 4 can be set to a larger number so that electric power is preferentially supplied to other electric devices 140.

Moreover, because the battery B can serve as a coupling member to connect the pair of the adaptor members 120, an attaching operation of attaching the adaptor 12 can be performed easily. It is preferable that the battery B is detachably attached to the adaptor members 120.

Figure 11A:
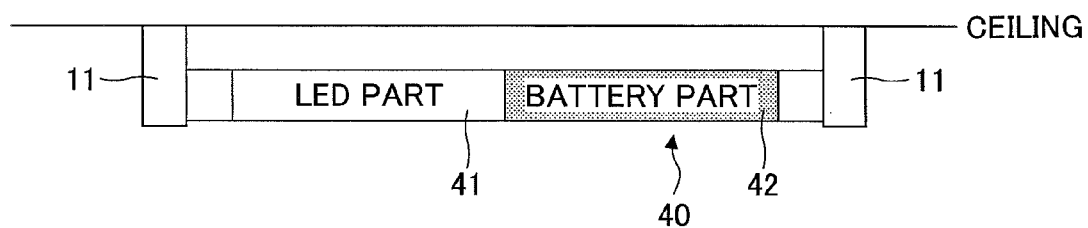
FIG. 11A is a side view of another example of the illumination device.
Figure 11B:
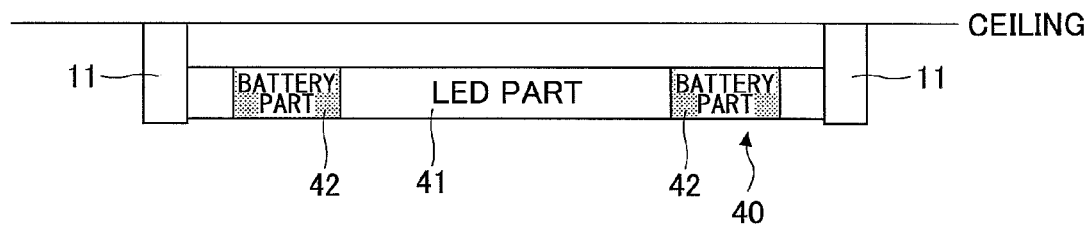
FIG. 11B is a side view of another example of the illumination device.

The LED lamp 4 may be configured as illustrated in FIG. 11A or 11B. That is, an LED lamp 40 illustrated in FIGS. 11A and 11B includes an LED tube 41 shorter than the LED tube 4a illustrated in FIG. 8A and one or more battery parts 42 attached to the LED tube 41. The LED tube 41 and the one or more battery parts 42 together form an LED tube having the same straight-tube shape as the LED tube 4a.

That is, in the example illustrated in FIG. 11A, the LED lamp 40 includes the LED tube 41 and the battery part 42 connected to one end of the LED tube 41 in an integral form. The LED tube 41 and the battery part 42 together form an LED tube having the same straight-tube shape as the LED tube 4a illustrated in FIGS. 8A and 8B and having the same connection terminals as the LED tube 4a. Additionally, although it is not illustrated in the figure, the electric power supply module 8 is incorporated in the battery part 42. Moreover, in the example illustrated in FIG. 11B, the LED lamp 40 includes the LED tube 41 and two battery parts 42 connected to opposite ends of the LED tube 41, respectively, in an integral form. The LED tube 41 and the two battery parts 42 together form an LED tube having the same straight-tube shape as the LED tube 4a and having the same connection terminals as the LED tube 4a illustrated in FIGS. 8A and 8B. Additionally, although it is not illustrated in the figure, the electric power supply common module 8 is incorporated in one of the battery parts 42. The number of the LED tubes 41 and the number of the battery parts 42 are not limited to those illustrated in FIGS. 11A and 11B, and the number and arrangement of the LED tubes 41 and the battery parts 42 may be appropriately changed if it is necessary.

Figure 12A:
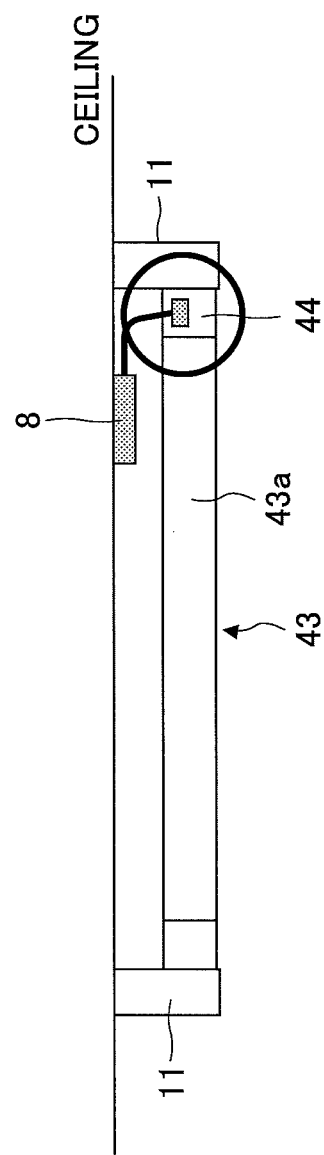
FIG. 12A is a side view of another example of the illumination device.
Figure 12B:
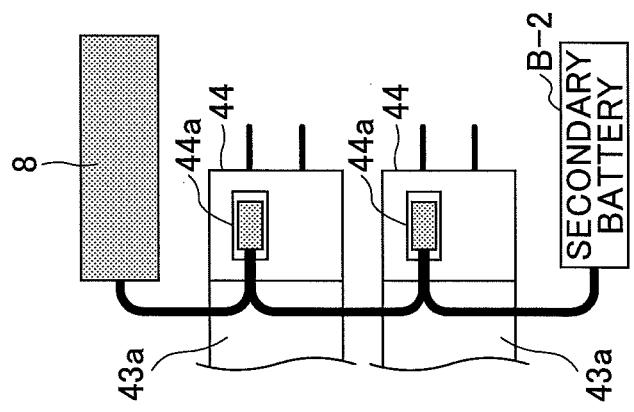
FIG. 12B is an enlarged plan view of a portion surrounded by a circle in FIG. 12A.

The LED lamp 4 may be configured as illustrated in FIGS. 12A and 12B. FIG. 12A illustrates an LED lamp 43 having a plurality of LED tubes 43a. FIG. 12B is an enlarged plan view of a portion surrounded by a circle in FIG. 12A.

A power supply to the LED lamp 43 is controlled by the electric power supply common module 8. An attachment socket 44 of each of the LED tubes 43a is provided with a control terminal 44a as illustrated in FIG. 12B. The control terminals 44a of the LED tubes 43a are connected to each other and also connected to the electric power supply common module 8 and a secondary battery B-2. The electric power supply common module 8 and the secondary battery B-2 are located and fixed near the LED tubes 43a. The electric power supply module 8 controls electric power supply to the plurality of LED tubes 43a. Thus, the electric power control of the LED lamp 43 can be achieved while reducing an initial cost of equipment investment.

Additionally, the LED lamp 43 can be activated without receiving electricity from either of the electric power supply system 2 and the secondary battery 3 especially in case of emergency. Accordingly, by providing the battery B-2 to the LED lamp 43, the priority order of the LED lamp 43 can be set to a larger number so that electric power is preferentially supplied to other electric devices 140. Thereby, the electric power control system using the LED lamp 43 can be excellent in adaptability and correspondency.

[Electric Power Control Method]

Figure 13A:
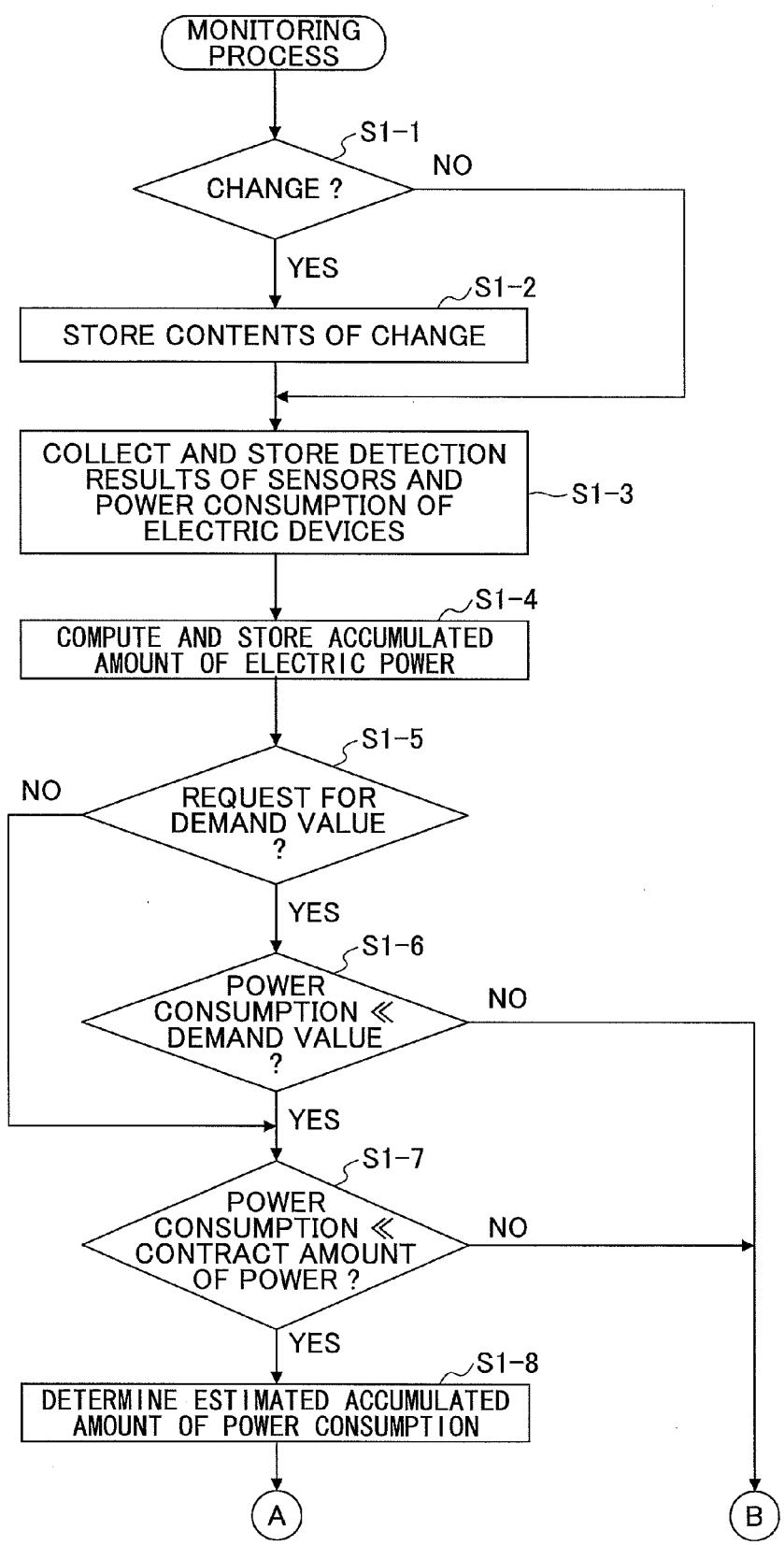
FIG. 13A is a part of a flowchart of a monitoring process performed in the electric power control system.
Figure 13B:
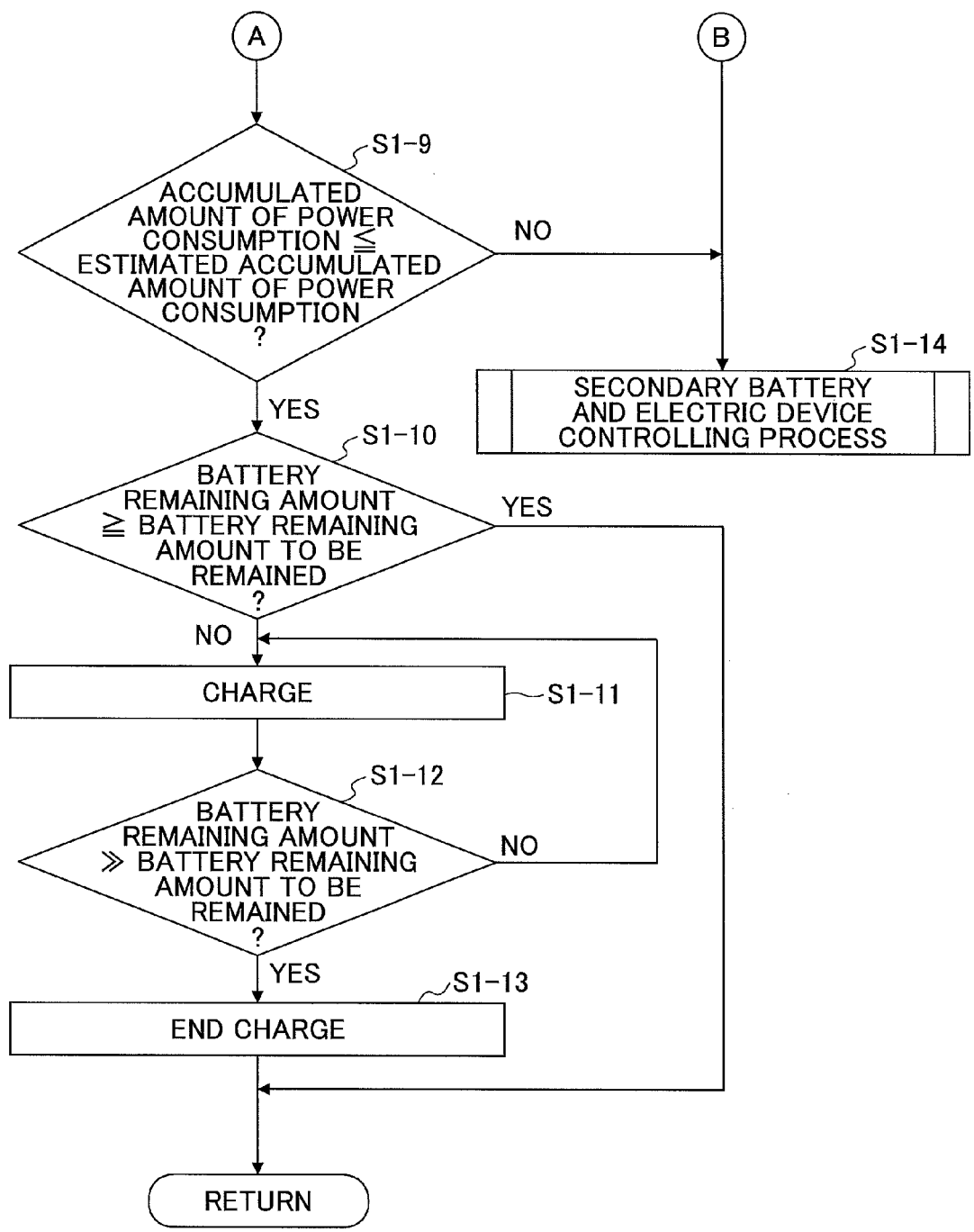
FIG. 13B is a remaining part of the flowchart of the monitoring process performed in the electric power control system.
Figure 14A:
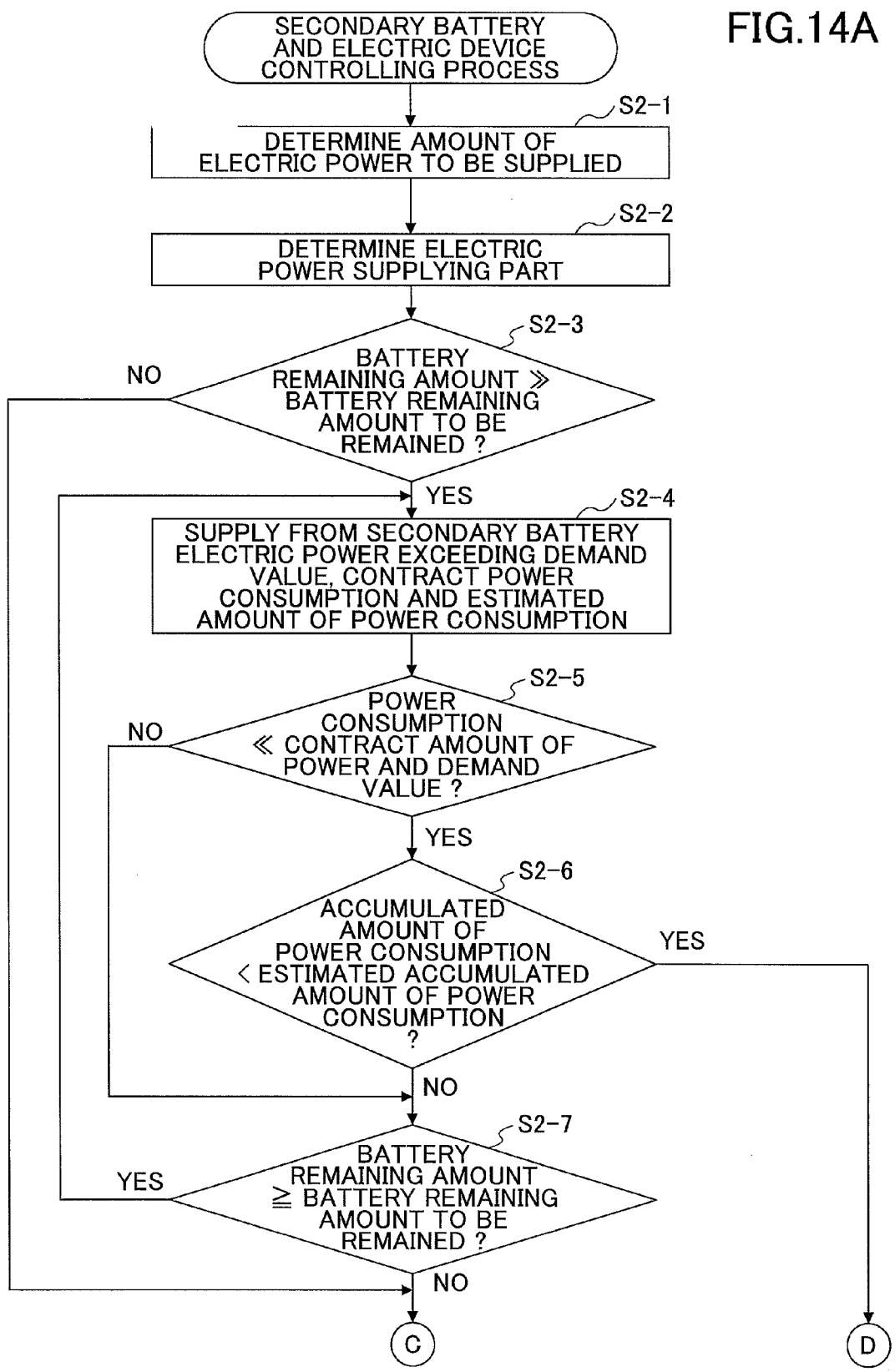
FIG. 14A is a part of a flowchart of a secondary battery and electric device controlling process performed in the electric power control system.
Figure 14B:
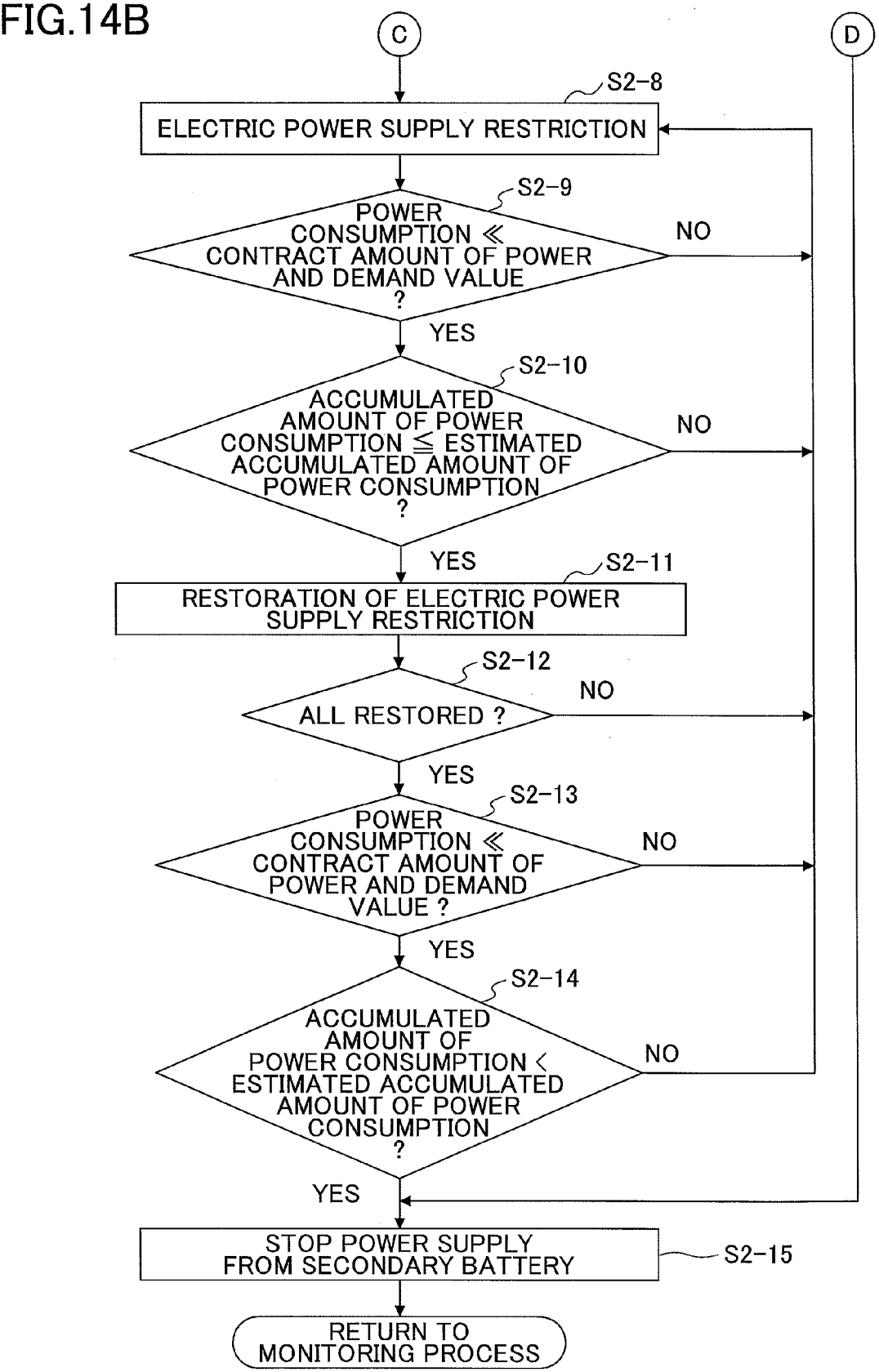
FIG. 14B is a remaining part of the flowchart of the secondary battery and electric device controlling process performed in the electric power control system.

A description is given below, with reference to FIGS. 13A and 13B and FIGS. 14A and 14B, of an electric power control method achieved by the electric power control system 1 according to the present embodiment. FIGS. 13A and 13B illustrate a monitoring process performed in an electric power control process. FIGS. 14A and 14B illustrate a secondary battery and electric device controlling process performed in the electric power controlling process.

First, a description is given, with reference to FIGS. 13A and 13B, of the monitoring process. It should be noted that FIG. 13A illustrates a part of the monitoring process and FIG. 13B illustrates a remaining part of the monitoring process.

The management computer 31 performs the monitoring process illustrated in FIGS. 13A and 13B repeatedly at every predetermined time including in a real time so as to control power supply to the electric devices 140.

The management computer 31 of the electric power control device 30 checks, when a predetermined time is reached, whether there is a change in control condition data previously stored in the electric power condition data storing part 33. That is, for example, the management computer 31 checks the previously set control condition data such as the demand value, the contract amount of electric power, the total amount of power consumption, the battery remaining amount value, etc., (step S1-1). Additionally, the management computer 31 checks in steps S1-1 whether a change has been made in setting information of a priority order of the electric devices 140 stored in the control target device data storing part 34. If there has been no change (NO of step S-1), the process proceeds to step S1-3.

If there is a change (YES of step S1-1), the management computer stores contents of the change in each of the corresponding strong parts (step S1-2).

Then, the management computer 31 collects detection data output by the human body sensor 71, the illuminance sensor 72, the temperature sensor 73 and the humidity sensor 74, and the collected detection data is stored in the detection data storing part 32 together with a sensor identifier for identifying each of the sensors which have output the collected detection data. Additionally, the management computer 31 collects information regarding an amount of power consumption (kW) of each of the electric devices 140. The information regarding an amount of power consumption is collected from, for example, detection data output by the electric power sensor 70 provided in the electric power supply common module 8. The management computer 31 stores the information regarding an amount of power consumption in the detection data storing part 32 together with sensor identifiers and information regarding a time of detection.

Then, the management computer 31 checks (monitors) the electric power condition data storing part 33 whether a demand value request has been received from an external part such as an electric power company or a government (step S1-5). If there is no request (NO in step S1-5), the process proceeds to step S1-7. Here, the demand value request is a request for reducing an amount of power consumption for a reason that, for example, electric power will be in short supply temporarily due to a large amount of power consumption. Accordingly, the process of step S1-5 is not necessarily performed, and if there is no demand value request from the first, the process of step S1-5 may be skipped and the process proceeds to step S1-7.

If the demand value request has been received (YES in step S1-5), the management computer 31 determines whether the amount of power consumption detected in the process of step S1-3 is sufficiently smaller than the demand value (step S1-6). Here, "sufficiently smaller than" means that, for example, if the demand value is 100, the sufficiently smaller value is 90.

If the amount of power consumption is larger than or equal to the demand value (NO in step S1-6), the management computer is required to control electric power supply to the electric devices 140 using the secondary battery 3 (step S1-14). Accordingly, the secondary battery and electric device controlling process illustrated in FIGS. 14A and 14B is performed.

Then, if the amount of power consumption is sufficiently smaller than the command value, the management computer 31 determines whether the amount of power consumption is sufficiently smaller, that is, whether the command value has a sufficient margin, by referring to data stored in the electric power condition data storing part 33 (step S1-7). If the amount of power consumption is not sufficiently smaller than the contract amount of electric power (more than 90%) (NO in step S1-7), the process proceeds to step S1-14.

If the amount of power consumption is sufficiently smaller than the contract amount of electric power (YES in step S1-7), the management computer 31 determines an estimated accumulated amount of power consumption for each 30 minutes. The estimated accumulated amount of power consumption is determined based on a total amount of power consumption per one day, which is previously set by a user, and a result of a total amount of power consumption for each 30 minutes in the past one week (step S1-8).

The management computer 31 determines whether the accumulated amount of power consumption computed in the process of step S1-4 is smaller than or equal to the estimated accumulated amount of power consumption determined in the process of step S1-8 (step S1-9). If the accumulated amount of power consumption is larger than the estimated accumulated amount of power consumption (NO in step S1-9), it is necessary to perform the secondary battery and electric device controlling process, and the process proceeds to step of S1-14.

If the accumulated amount of power consumption is smaller than or equal to the estimated accumulated amount of power consumption (YES in step S1-9), the management computer 31 detects a remaining amount value of the secondary battery 3, that is, an amount of electric power currently stored in the secondary battery 3. Then, the management computer 31 determines whether the detected remaining amount value is larger than or equal to a battery remaining amount value, which is an amount of electric power to be remained in the battery for emergency, by referring to data stored in the electric power condition data storing part 33. If the detected remaining amount value is larger than or equal to the battery remaining amount value (YES in step S1-10), the process proceeds to step S1-14 to perform the secondary battery and electric device controlling process.

If the detected remaining amount value is smaller than the battery remaining amount value (NO in step S1-10), the management computer 31 charges the secondary battery 3 by supplying electric power from the electric power supply system 2 to the secondary battery 3.

The management computer 31 repeatedly performs a determining process of whether the remaining amount value of the secondary battery 3 is sufficiently larger than the battery remaining amount value to be stored in the secondary battery 3 for emergency during the charging operation (step S1-12).

If the remaining amount value becomes sufficiently larger than the battery remaining amount value for emergency (YES in step S1-12), the management computer 31 ends the charging operation by stopping the power supply to the secondary battery 3 (step S1-13). Thereafter, the process returns to the monitoring process of step S1-1.

A description is given below, with reference to FIGS. 14A and 14B, of the secondary battery and electric device controlling process. It should be noted that FIG. 14A illustrates a part of the secondary battery and electric device controlling process and FIG. 14B illustrates a remaining part of the secondary battery and electric device controlling process.

According to the secondary battery and electric device controlling process, the management computer 31 performs an efficient power control by controlling power supply from the secondary battery 3 to the electric devices 140. Additionally, the management computer 31 determines either one of the electric power supply system 2 and the secondary battery 3 as an electric power supplying part to supply electric power to the electric devices 140. Further, the management computer 31 determines an amount of electric power to supply or determines whether to stop supply of electric power.

First, the management computer 31 determines an amount of electric power supply (an electric power supply amount) for each of the electric devices 140 based on the control device data such as the detection data stored in the detection data storing part 32, the control condition data stored in the electric power condition data storing part 33, and the device identification information and priority order information stored in the control target device data storing part 34 (step S2-1). Because each of the electric devices 140 according to the present embodiment is equipped with the electric power supply common module 8, the electric power control according to the determined electric power supply amount can be performed on each of the electric devices 140. Similarly, according to the electric power supply common module 8 incorporated in each of the electric devices 140, the electric power control according to the determined electric power supply amount can be performed on each of the electric devices 140 connected to the intelligent tap 9.

Further, the management computer 31 executes a program to increase the battery remaining amount value to be remained based on the information regarding a planned power outage, the information regarding demand response, and information regarding an interruption of electric power supply from the electric power supply system that are stored in the electric power condition data storing part 33. That is, a power supply control which does not deteriorate a comfort of individuals is achieved even when a forcible power restriction is applied.

Specifically, according to the electric power control based on the information regarding a demand response, an operation of each of the electric devices 140 is performed with an electric power received from the electric power supply system 2 as a limit electric power, and when the supplied electric power is insufficient, electric power is supplied preferentially to some of the electric devices 140, which may cause a problem in a human activity when the power supply is stopped. If the electric power is still insufficient, electric power is supplied from the secondary battery 3.

Then, the management computer 31 determines either one of the electric power supply system 2 and the secondary battery 3 as the electric power supplying part to supply electric power to the electric devices 14 on an individual device basis (step S2-2). At this time, the management computer 31 determines the electric power supplying part based on the priority order information and the device identification information stored in the control target device data storing part 34. In the electric devices 140 connected to the intelligent tap 90, the electric power supplying part can be determined for each of the electric devices 140 connected to the intelligent-type tap 9 because the intelligent tap 9 has transmitted information regarding types of the electric devices 140 connected to the intelligent tap 9. For example, changing the electric power supplying part is timely and appropriately performed so that, for example, electric power is always supplied to the electric device to which the priority order is set as high as "1".

Then, similar to the process of step S1-12, the management computer 31 detects a remaining amount value from the secondary battery 3, and determines whether the detected remaining amount value is sufficiently larger than the battery remaining amount value to be remained for emergency by referring to data stored in the electric power condition data storing part 33 (step S2-3). This remaining amount checking process is performed for the case where the process of step S1-12 has not been performed. If the battery remaining amount value is smaller than the battery remaining amount value to be remained for emergency, it is necessary to control the power supply immediately, and the process proceeds to each process subsequent to step S2-8.

If the remaining amount value of the secondary battery 3 is sufficiently larger than the battery remaining amount value to be remained (YES in step S2-3), the management computer 31 causes an electric power, which exceeds the demand value and the contract amount of power consumption stored in the electric power condition data storing part 33 and the estimated accumulated amount of power consumption determined in the process of step S1-8, to be supplied from the secondary battery 3 (S2-4). Thereby, an effective power saving can be performed while suppressing the electric power supply from the electric power supply system 2.

Then, the management computer 31 collects a current amount of power consumption from the electric power sensors 70, and determines whether the current amount of electric power is sufficiently smaller than the demand value and the contract amount of power consumption stored in the electric power condition data storing part 33 (step S2-5). If the current amount of power consumption is larger than the demand value and the contract amount of power consumption (NO in step S2-5), the process proceeds to step S2-7.

If the current amount of power consumption is smaller than or equal to the demand value and the contract amount of power consumption (YES in step S2-5), the management computer 31 determines whether the accumulated amount of power consumption thus far is smaller than or equal to the estimated amount of power consumption determined in the process of step S1-8 (step S2-6). If the accumulated amount of power consumption thus far is smaller than or equal to the estimated accumulated amount of power consumption (YES in step S2-6), the management computer 31 determines that the power supply is stable and stops the power supply from the secondary battery 3 (step S2-15).

If the accumulated amount of power consumption thus far is larger than the estimated accumulate amount of power consumption (NO in step S2-6), the management computer 31 detects a remaining amount value from the secondary battery again, and determines whether the detected remaining value is larger than or equal to the battery remaining amount value to be remained for emergency by referring to data stored in the electric power condition data storing part 33 (step S2-7). If the detected remaining value is larger than or equal to the battery remaining amount value to be remained for emergency (YES in step S2-2), the management computer 31 continues the power supply from the secondary battery 3.

If the detected remaining value has not reached the battery remaining amount value to be remained for emergency (NO in step S2-7), it is necessary to further supply electric power from the secondary battery. Thus, the management computer 31 applies an electric power supply restriction on the electric devices 140 sequentially in an order from the electric devices 140 having a lower priority first (step S2-8). The electric power supply restriction includes a control of reducing an electric power supply amount, a control of stopping the electric power supply, and a control of determining either one of the electric power supply system 2 and the secondary battery 3 as the electric power supplying part for supplying electric power to the electric devices 140. The control of reducing an electric power supply amount includes a process of determining an amount of electric power supplied to each of the electric devices 140. The electric devices 140 on which the above-mentioned electric power supply restriction is applied are determined based on the detection data stored in the detection data storing part 32 and the device identification information and the priority order information stored in the control target device data storing part 34.

For example, if a target device is the illumination device 4 having a battery, and there is no detection data output from the human body sensor 71 and the priority level is set as low as "3", the management computer 31 stops the power supply to the illumination device 4. Moreover, if the priority level is set to "A", which indicates to be subjected to the control of the electric power control device 30, there may be a case where an amount of supply of electric power is greatly reduced or even stopped. However, if it is determined that an electric power is necessary at present time, the electric power is preferentially supplied so that an electric power supply restriction is applied to other electric devices 140 having a low priority level.

If the intelligent tap 9 is used to supply electric power to the electric devices connected thereto, the electric power control can be performed according to the priority level on an individual device basis because the intelligent tap 9 sends the information indicating which electric device 140 is connected thereto to the electric power control device 30. Additionally, the intelligent tap 9 is provided with the priority order setting part 97, which can change the priority level manually, yhus the electric power control device 30 can perform the electric power supply control without deteriorating a comfort of individuals by a user changing the priority levels of the electric devices 140 on an individual device basis. As for the determination of the electric power supply control, a factor of season such as a period of time (day or night) may be considered further. That is, if it is a day time, the LED lamp 4 may be turned down, or only the LED lamp 4 located near a window may be turned down so that a control can be made in a range where a comfort of individuals is not deteriorated. If it is a night time, considering necessity of light for preparing for a sudden accident or disaster, a control may be made to maintain a sufficient battery remaining amount to be remained.

Then, the management computer 31 collects an amount of power consumption of each of the electric devices 140 on which the electric power supply restriction is applied from the electric power sensors 70, and determines whether the amount of power consumption is sufficiently smaller than the demand value and the contract amount of power consumption stored in the electric power condition data storing part 33 (S2-9).

If the amount of power consumption exceeds the range of the demand value and the contract amount of power consumption (NO in step S2-9), the process returns to step S2-8 and further electric power supply restriction is applied. At this time, if the power consumption is larger than or equal to the demand value, the management computer 31 performs a further electric power supply control of reducing a performance of the air-conditioning device 5 (reducing air flow amount) or switching the electric power supply to the PC 62 to the secondary battery 3.

If the amount of power consumption is smaller than or equal to the demand value and the contract amount of power consumption (YES in step S2-9), the management computer 31 determines whether the accumulated amount of power consumption thus far and the estimated amount of power consumption determined in the process of step S1-8 are the same amount (S2-10).

If the accumulated amount of power consumption thus far and the estimated accumulated amount of power consumption determined are the same amount (YES in step S2-10), the management computer 31 determines that the electric power supply is stable, and returns the electric power supply restriction applied to the electric devices 140 having a low priority level to a normal time restriction (step S2-11). When returning the power supply restriction control, it is gradually returned in accordance with the priority order information stored in the control target device data storing part 34. If the estimated accumulated amount of power consumption determined in the process of step S1-8 is smaller than the accumulated amount of power consumption (NO in step S2-11), the process returns to step S2-8 to perform a further electric power supply control.

Then, the management computer 31 checks whether the electric power supply restriction has returned to a normal restriction for each of the electric devices 140 of which priority level is set low (step S2-12). If it has not been returned to the normal restriction (NO in step S2-12), it is necessary to continuously apply a certain electric power supply restriction. Thus, the management computer 31 repeats the process of steps S2-8 to S2-11 to repeatedly apply an appropriate electric power supply restriction. During that time, a number of the electric devices 140 of which electric power supply restriction is returned to the normal restriction is increased.

If the electric power supply restriction is returned to the normal restriction for all of the electric devices 140 (YES of step S2-12), the management computer 31 collects a present amount of power consumption of each of the electric devices 140 from the electric power sensors 70. Then, the management computer 31 checks whether the collected amount of power consumption is sufficiently smaller than the demand value and the contract amount of power consumption stored in the electric power condition data string part 33 (S2-13). If the amount of power consumption is larger than, for example, 90% of the demand value and the contract amount of power consumption (NO in step S2-13), the process returns to step S28 and the electric power supply control is performed.

If the amount of power consumption becomes sufficiently smaller than the demand value and the contract value (YES in step S-13), the management computer, 31 determines whether the accumulated amount of power consumption thus far is smaller than or equal to the estimated accumulated amount of power consumption determined in the process of S1-8 (S2-14). If the accumulated amount of power consumption thus far is larger than the estimated accumulated amount of power consumption (NO in step S2-14), the process returns to step S2-8 to perform the electric power supply restriction.

If the accumulated amount of power consumption is smaller than or equal to the estimated accumulated amount of power consumption (YES in step S2-14), the management computer determines that the electric power supply is stable, and stops the electric power supply from the secondary battery 3 (step S2-15). Thereafter, the process returns to each step of the monitoring process illustrated in FIGS. 13A and 13B so that the monitoring process is repeatedly performed.

Although not illustrated in the figures, if the power supply from the electric power supply system 2 is ceased (interrupted), it is desirable to display the remaining amount value of the secondary battery 3 and a remaining time usable by each of the electric devices 140 which use the electric power from the secondary battery 3 are displayed on the display device 35 of the electric power control device 30 (refer to FIG. 3).

Additionally, the above-mentioned "monitoring process" and "secondary battery and electric device controlling process" are performed by being determined by a previously set program. Such a program may be previously installed in the management computer 31 and updated externally.

As mentioned above, in the power control system 1 using the secondary battery according to the present embodiment, the electric power supply common module 8 (control circuit) is provided to each of the electric devices 140. Thus, the detection data information such as an amount of power consumption for each of the electric devices 140 can be gathered into the electric power control device 30.

By providing the secondary battery 3 to which the electric power control device 30 is attached in the above-mentioned system having the electric devices 140, it becomes possible to determine some of the electric devices 140 to which electric power is supplied from the electric power supply system 2 and some of the electric devices 140 to which electric power is supplied from the secondary battery 3 based on the collected information and the battery remaining amount value, the demand value, the contract amount of power consumption, the accumulated amount of power consumption, the total amount of power consumption, etc.

That is, if the system is introduced into an office environment, the demand value can be observed as strictly as possible by reducing a performance of the air-conditioning device 5 or switching the electric power supply to the PC 62 to the secondary battery 3 if the total electric power consumption becomes close to the demand value. Additionally, if it is a day time, the LED lamp 4 may be turned down, or only the LED lamp 4 located near a window may be turned down so that a control can be made in a range where a comfort of individuals is not deteriorated. If it is a night time, considering necessity of light for preparing for a sudden accident or disaster, a control can be made to maintain a sufficient battery remaining amount to be remained.

Additionally, for the forcible electric power supply restriction at a demand response time, an electric power supplied from the secondary battery 3 is used while observing the restriction, thereby permitting an operation that does not deteriorate a comfort of individuals. Additionally, if a power supply is interrupted due to an accident or a disaster, it can be appropriately and rapidly responded to such a situation.

Accordingly, the above-mentioned power control system 1 can achieve an optimum electric power supply control without deteriorating a comfort of individuals in consideration of a use condition of the electric devices, a situation of presence of persons, a temperature in a room, an illuminance in a room, a battery remaining amount value, etc., while maintaining a total amount of power consumption below a demand value if it is an office environment, or below a contract amount of power consumption if it is a house environment.

Second Embodiment

A description will now be given of an electric power control system 200 using a secondary battery according to a second embodiment of the present invention. The electric power control system 200 according to the second embodiment is based on substantially the same technical thought as the first embodiment, and a description is given below of differences between the first embodiment and the second embodiment.

The power control system 1 using the secondary battery according to the first embodiment has a configuration in which the electric power supply common module 8 is mounted on each of the electric devices 140. Although the electric power supply common module 8 is not mounted on each of the electric devices 140 that are connected to the intelligent tap 9, electric power supply to each of the electric devices 140 connected to the intelligent tap 9 is also controlled by the electric power supply common module 8 incorporated in the intelligent tap 9.

However, when the power control system 1 according to the first embodiment is introduced into an existing office building, it is impractical to mount the electric power supply common module 8 to all of the electric devices 140 in view of investment cost.

The electric power control system 200 according to the second embodiment is a more practical system using a secondary battery.

Figure 15:
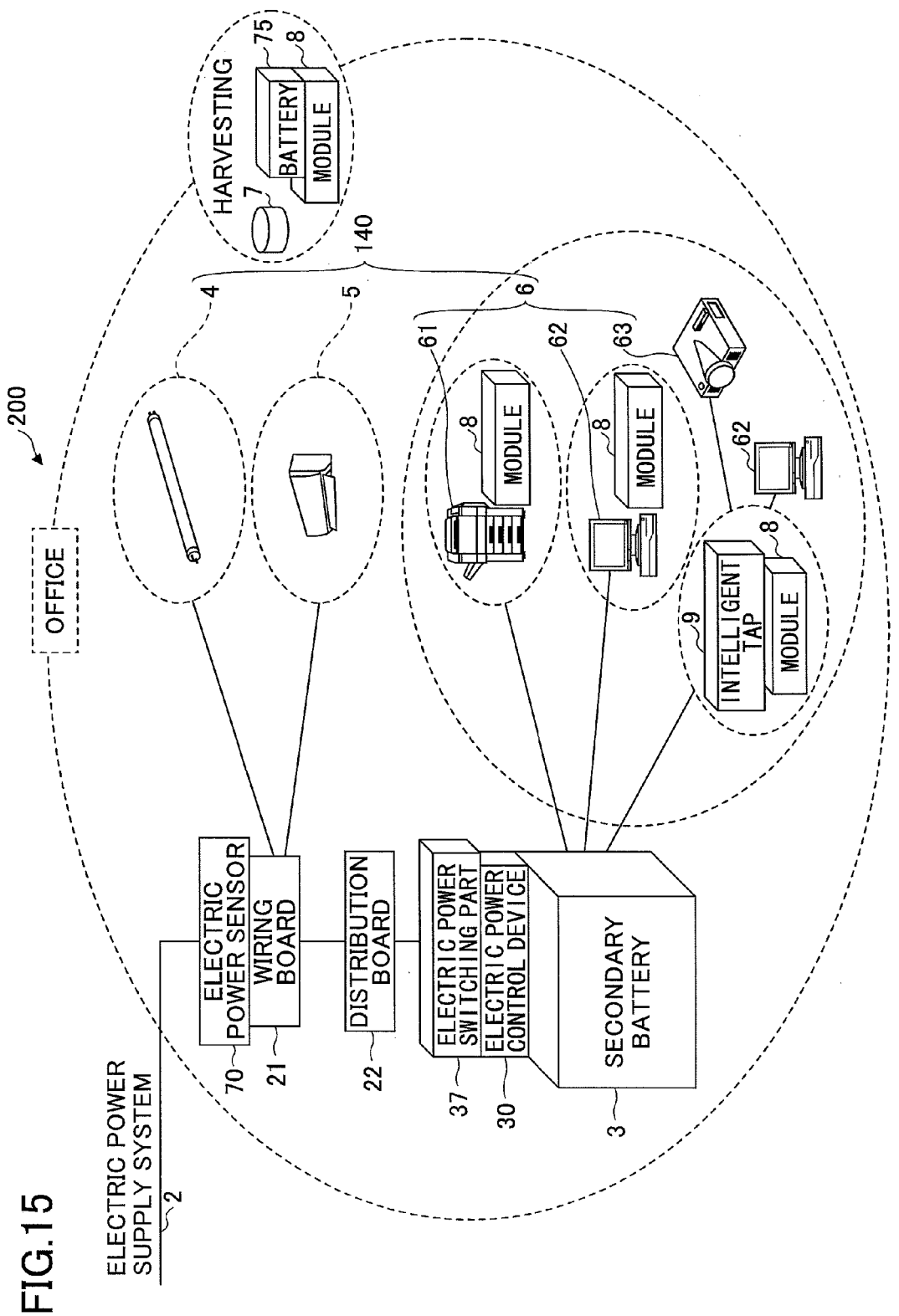
FIG. 15 is an illustration of an outline of an electric power control system according to a second embodiment.

The electric power control system 200 illustrated in FIG. 15 is the same as the electric power control system 1 according to the first embodiment in that the electric power control system 200 includes the electric power supply system 2 and the secondary battery 3 as an electric power supplying part for supplying electric power to, for example, an office building. Additionally, the electric power supply system 200 includes the wiring board 21 and the distribution board 22.

The electric power sensor 70 is attached to the wiring board 21. The electric power sensor 70 is provided with a wireless communication function, and is made into a module. Similar to the electric power control system 1 according to the first embodiment, the electric devices 140, which are supplied with electric power from the electric power supplying part, include the illumination device 4, the air-conditioning device 5 and the OA device 6 (including the MFP 61, the personal computer 62 and the projector 63).

Furthermore, similar to the first embodiment, the electric power control system 200 includes the environment detector 7 (the human body sensor 71, the illuminance sensor 72, the temperature sensor 73 and the humidity sensor 74). Although FIG. 15 illustrates a configuration of receiving electric power from the harvesting system, the electric power control system 200 may be supplied with electricity from the electric power supply system 2.

A difference between the electric power control system 200 and the electric power control system 1 according to the first embodiment is in that the illumination device 4 and the air-conditioning device 5 are not supplied with electric power from the secondary battery 3. On the other hand, the MFP 61, the personal computer 62 and another personal computer 62 and the projector 3 connected to the intelligent tap 9 are supplied with electric power from the secondary battery 3.

Additionally, in the electric control system 200, the personal computer 62 and another personal computer 62 and the projector 63 connected to the intelligent tap 9 are connected to the electric power control device 30 via the respective electric power supply common modules 8 to construct an electric power information network.

On the other hand, the electric power supply common module 8 is not mounted on the illumination device 4 and the air-conditioning device 5, and the illumination device 4 and the air-conditioning device 5 do not constitute an electric power information network with the electric electric power control device 30.

Accordingly, the electric power control device 200 cannot recognize an amount of power consumption of all of the electric devices 140. However, by providing the electric power sensor 70 to the wiring board 21 as mentioned before, the electric power control device 30 can recognize a total amount of power consumption of the entire office (including the illumination device 4 and the air-conditioning device 5).

Thus, even if the total amount of power supply becomes close to the demand value, the electric power control device 30 can appropriately supply electric power to the electric devices 140 by performing an electric power restriction such as changing the electric power supplying part, which supplies electric power to the MFP 61 and the personal computer 62 that can be supplied with electric power from the secondary battery 3, from the electric power supply system 2 into the secondary battery 3.

The electric power control process performed in the electric power control system 200 according to the second embodiment is the same as the monitoring process of FIGS. 13A and 13B and the secondary battery and electric device controlling process of FIGS. 14A and 14B, and a description thereof will be omitted.

The above-mentioned electric power control system 200 according to the second embodiment is capable of effectively applying an electric power restriction onto an electric device to which electric power is supplied only from the electric power supply system 2 by providing electric devices to which electric power can be supplied from either of the electric power supply system 2 and the secondary battery 3. Accordingly, the second embodiment can materialize a system which contributes to an effective energy saving with a comfort of individuals as an entire office.

Third Embodiment

A description will now be given of an electric power control system 300 using a secondary battery according to a third embodiment of the present invention. The electric power control system 300 according to the third embodiment is based on substantially the same technical thought as the second embodiment, and a description is given below of differences between the second embodiment and the third embodiment.

Figure 16:
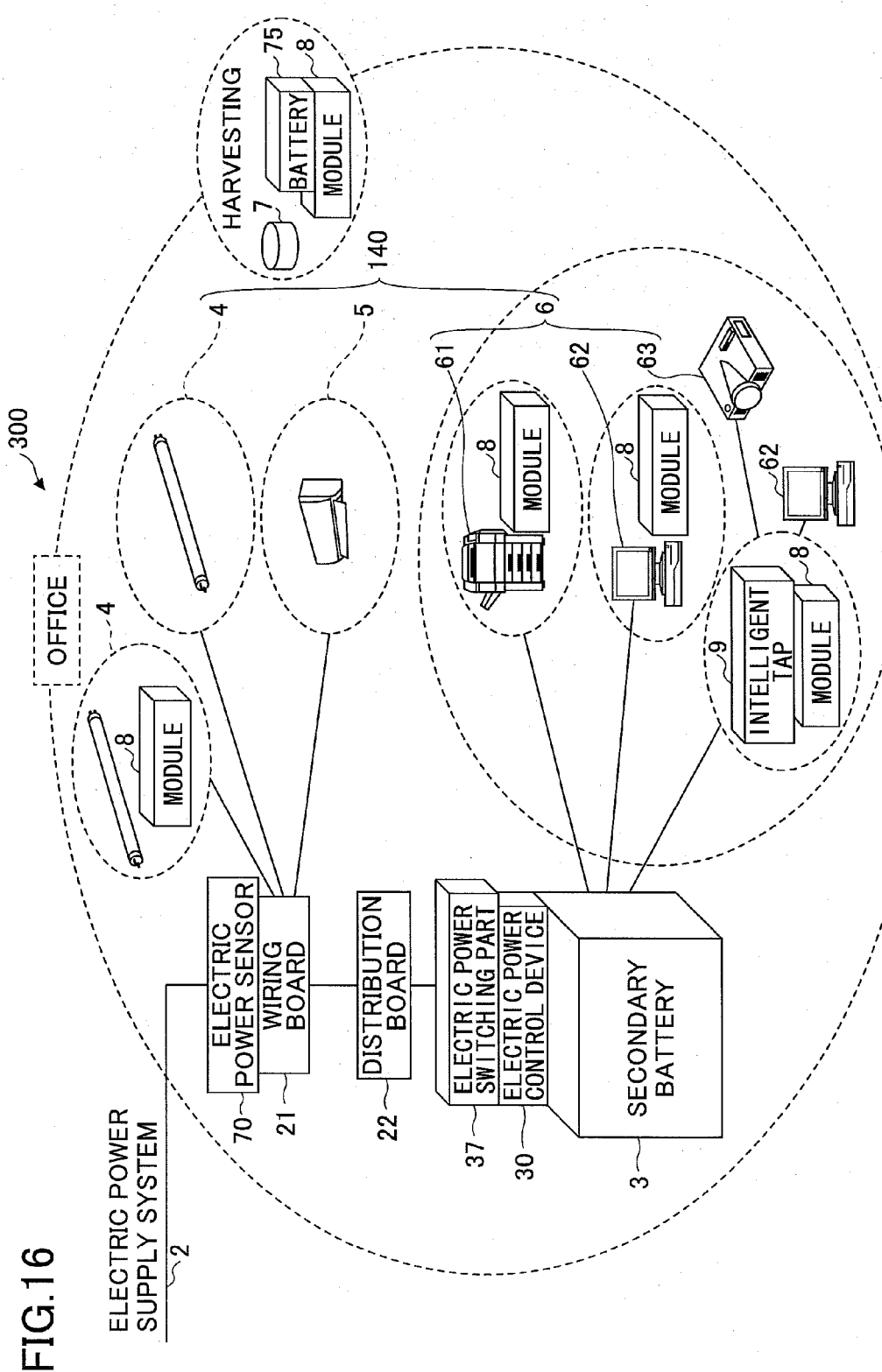
FIG. 16 is an illustration of an outline of an electric power control system according to a third embodiment.

The electric power control system 300 illustrated in FIG. 16 includes the electric power supply system 2 and the secondary battery 3 as an electric power supplying part for supplying electric power to, for example, an office building. Additionally, the electric power supply system 2 includes the wiring board 21 and the distribution board 22 that serve as an electric power receiving terminal. Similar to the electric power supply system 200 according to the second embodiment, the electric power sensor 70 is attached to the wiring board 21. The electric power sensor 70 is provided with a wireless communication function, and is made into a module.

Similar to the electric power supply system 200 according to the second embodiment, the electric devices 140, the illumination device 4 and the air-conditioning device 5 are not supplied with electric power from the secondary battery 3. Additionally, the MFP 61, the personal computer 62, and another personal computer 62 and the projector 3 that are connected to the intelligent tap 9 are supplied with electric power from the secondary battery 3.

Additionally, in the electric control system 300, the personal computer 62 and another personal computer 62 and the projector 63 that are connected to the intelligent tap 9 are connected to the power control device 30 via the respective electric power supply common modules 8 to constitute an electric power information network.

A difference between the electric power control system 300 and the electric power control system 200 according to the second embodiment is in that the electric power supply common module 8 is mounted on a part of the illumination devices 4 and the air-conditioning devices 5 that are not supplied with electric power from the secondary battery 3.

Accordingly, the electric power control device 30 cannot recognize an amount of power consumption of all of the electric devices 140, but is capable of recognizing a total amount of power consumption of the entire office (including the illumination devices 4 and the air-conditioning devices 5) by providing the electric power sensor 70 to the wiring board 21 as mentioned before.

Thus, even if the total amount of power supply becomes close to the demand value, the electric power control device 30 can appropriately supply electric power to the electric devices 140 by performing an electric power restriction such as changing the electric power supplying part, which supplies electric power to the MFP 61 and the personal computer 62 that can be supplied with electric power from the secondary battery 3, from the electric power supply system 2 into the secondary battery 3. Additionally, because the electric power supply common module 8 is mounted to the illumination devices 4 and the air-conditioning devices 5 that are not supplied with electric power from the secondary battery 3, the electric power supply restriction can be applied to the illumination devices 4 and the air-conditioning devices 5.

The electric power control process performed in the electric power control system 300 according to the third embodiment is the same as the monitoring process of FIGS. 13A and 13B and the secondary battery and electric device controlling process of FIGS. 14A and 14B, and a description thereof will be omitted.

The above-mentioned electric power control system 300 according to the third embodiment is capable of effectively applying an electric power restriction onto not only the electric devices that can be supplied with electric power from both the electric power supply system 2 and the secondary battery 3 but also the electric devices that can be supplied with electric power only from the electric power supply system 2.

Moreover, while suppressing an investment cost, the electric power supply common module 8 is mounted to the electric devices 140 that especially require an electric power restriction, and, thus, an effective electric power control can be achieved by the electric power control device 30 provided to the secondary battery 3.

Fourth Embodiment

A description will now be given of an electric power control system 400 using a secondary battery according to a fourth embodiment of the present invention. The electric power control system 400 according to the fourth embodiment is based on substantially the same technical thought as the first to third embodiments, and a description is given below of differences between the fourth embodiment and the first to third embodiments.

Figure 17:
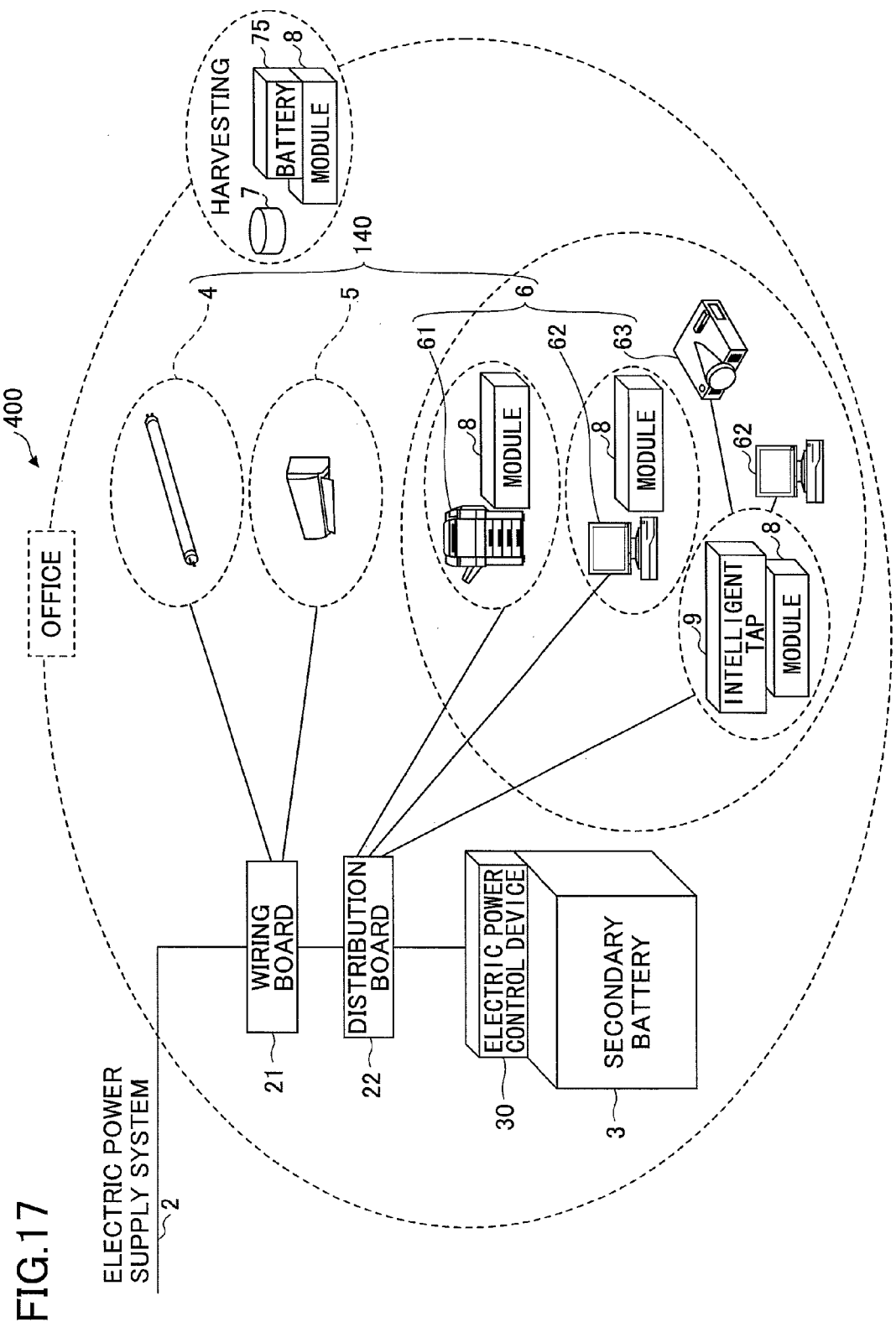
FIG. 17 is an illustration of an outline of an electric power control system according to a fourth embodiment.

The electric power supply system 2, the secondary battery 3, the electric devices 140 and the environment detector 7 that together constitute the electric power control system 400 illustrated in FIG. 17 are the same as those of the electric power control systems 100 to 300 illustrated in FIGS. 1, 15 and 16, and descriptions thereof will be omitted.

A difference between the electric power control system 400 according to the fourth embodiment and the electric power control systems 100 to 300 according to the first to third embodiments is in that the secondary battery 3 and the electric power supply system 2 are installed by being associated with each other in the electric power control system 400. Additionally, the electric power sensor 70 is not provided to the wiring board 21, and the electric power switching part 37 is not provided in the electric power control device 30 attached to the secondary battery 3.

An electric power supply relationship between the electric power supplying part (the electric power supply system 2, the secondary battery 3) and the electric devices 140 is the same as that of the electric power control system 200 illustrated in FIG. 15. That is, the illumination device 4 and the air-conditioning device 5 are not supplied with electric power from the secondary battery 3. On the other hand, the MFP 61, the personal computer 62, and another personal computer 62 and the projector 3 that are connected to the intelligent-type tap 9 are supplied with electric power from the secondary battery 3.

Additionally, in the electric control system 400, the personal computer 62 and the personal computer 62 and the projector 63 that are connected to the intelligent tap 9 are connected to the power control device 30 via the respective electric power supply common modules 8 to construct an electric power information network.

On the other hand, the electric power supply common module 8 is not mounted to the illumination device 4 and the air-conditioning device 5. Thus, the illumination device 4 and the air-conditioning device 5 do not construct an electric power information network with the electric power control device 30.

When the electric power supply system 2 and the secondary battery 3 are connected to each other, the power supply from the secondary battery 3 must be controlled so that a reverse power flow does not occur.

Figure 18:
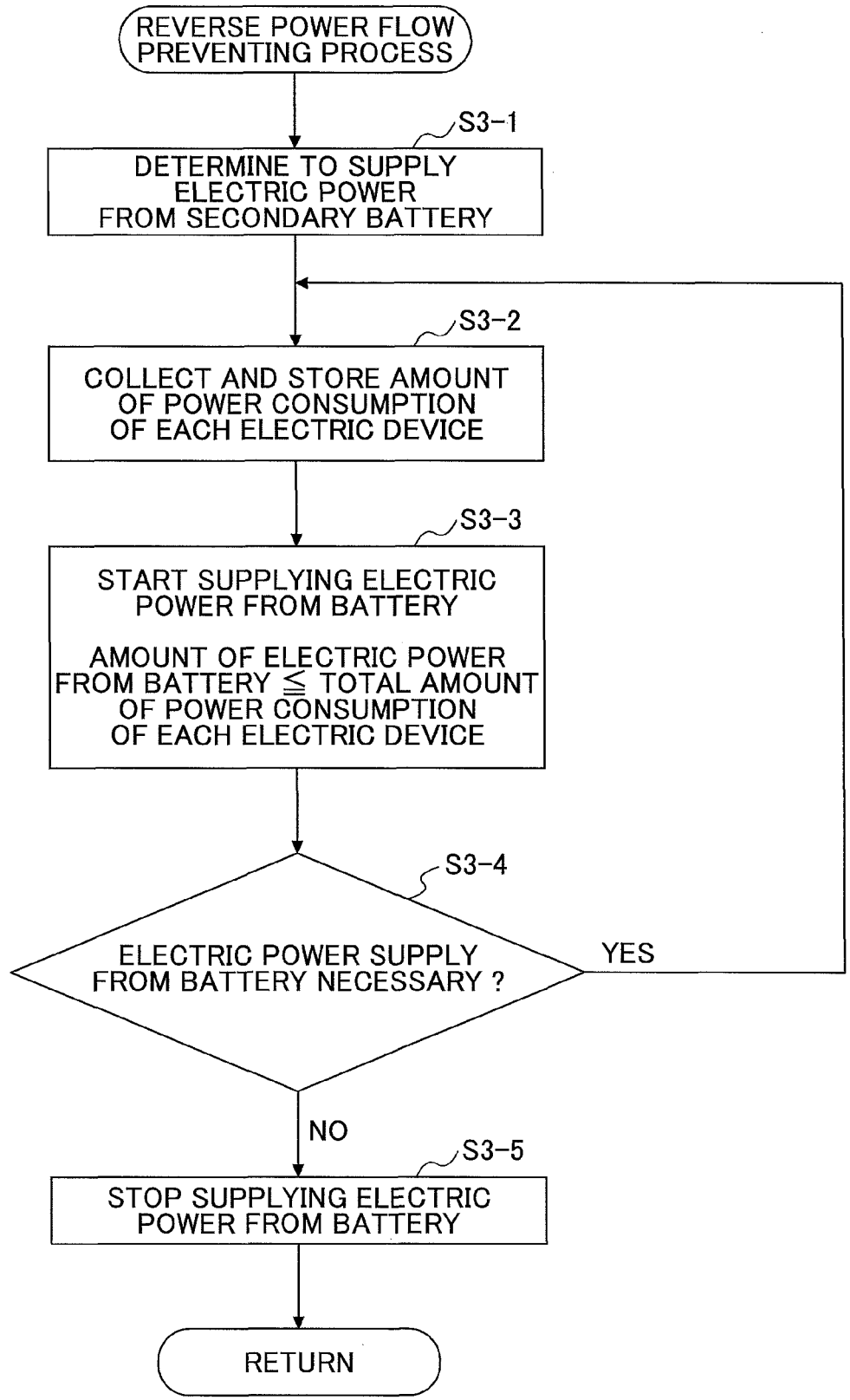
FIG. 18 is a flowchart of a reverse flow preventing controlling process according to the fourth embodiment.

Accordingly, the electric power control device 30 of the electric power control system 400 according to the present embodiment suppresses a reverse power flow by performing a reverse power flow preventing process illustrate in FIG. 18.

That is, the electric power control device 30 prevents a reverse power flow by controlling an amount of electric power supplied from the secondary battery 3 to be smaller than or equal to an amount of power consumption of the electric devices 140 that uses electric power from the secondary battery 3. A description is given below, with reference to FIG. 18, of the reverse power flow preventing process.

The management computer 31 of the electric power control device 30 determines the supply of electric power from the secondary battery 3 in the secondary battery and electric device controlling process illustrated in FIGS. 14A and 14B (step S3-1). At this time, the electric devices 140 that receive electric power from the secondary battery 3 have been determined.

The management computer 31 collects an amount of power consumption of the electric devices 140 that use electric power of the secondary battery 300 from the detection data output from the electric power sensors 70 provided in the electric power supply common module 8, and stores the collected information in the detection data storing part 32 together with a sensor identifier and information regarding a time of detection.

Then, the management computer 31 starts supplying electric power from the secondary battery 3. At this time, the electric power is supplied within a range in which the total of the collected amount of power consumption of the electric devices 140 are equal to or larger than an amount of electric power supplied from the secondary battery 3 (step S3-3).

Then, the management computer 31 determines whether supply of electric power from the secondary battery 3 is necessary (step S3-4). If supply of electric power from the secondary battery 3 is necessary (YES in step S3-4), the process returns to step S3-2 to repeat the process of steps S3-2 to S3-4. If supply of electric power from the secondary battery 3 is not necessary (NO in step S3-4), the supply of electric power from the secondary battery 3 is stopped (step S3-5).

The electric power control system 400 according to the fourth embodiment achieves an effective electric power control while preventing a reverse power flow by controlling the amount of electric power supplied from the secondary battery 3 to be smaller than or equal to the amount of power consumption of the electric devices 140 that use the electric power from the secondary battery 3.

The electric power control process performed in the electric power control system 400 according to the fourth embodiment is the same as the monitoring process of FIGS. 13A and 13B and the secondary battery and electric device controlling process of FIGS. 14A and 14B, and a description thereof will be omitted.

Fifth Embodiment

Figure 19:
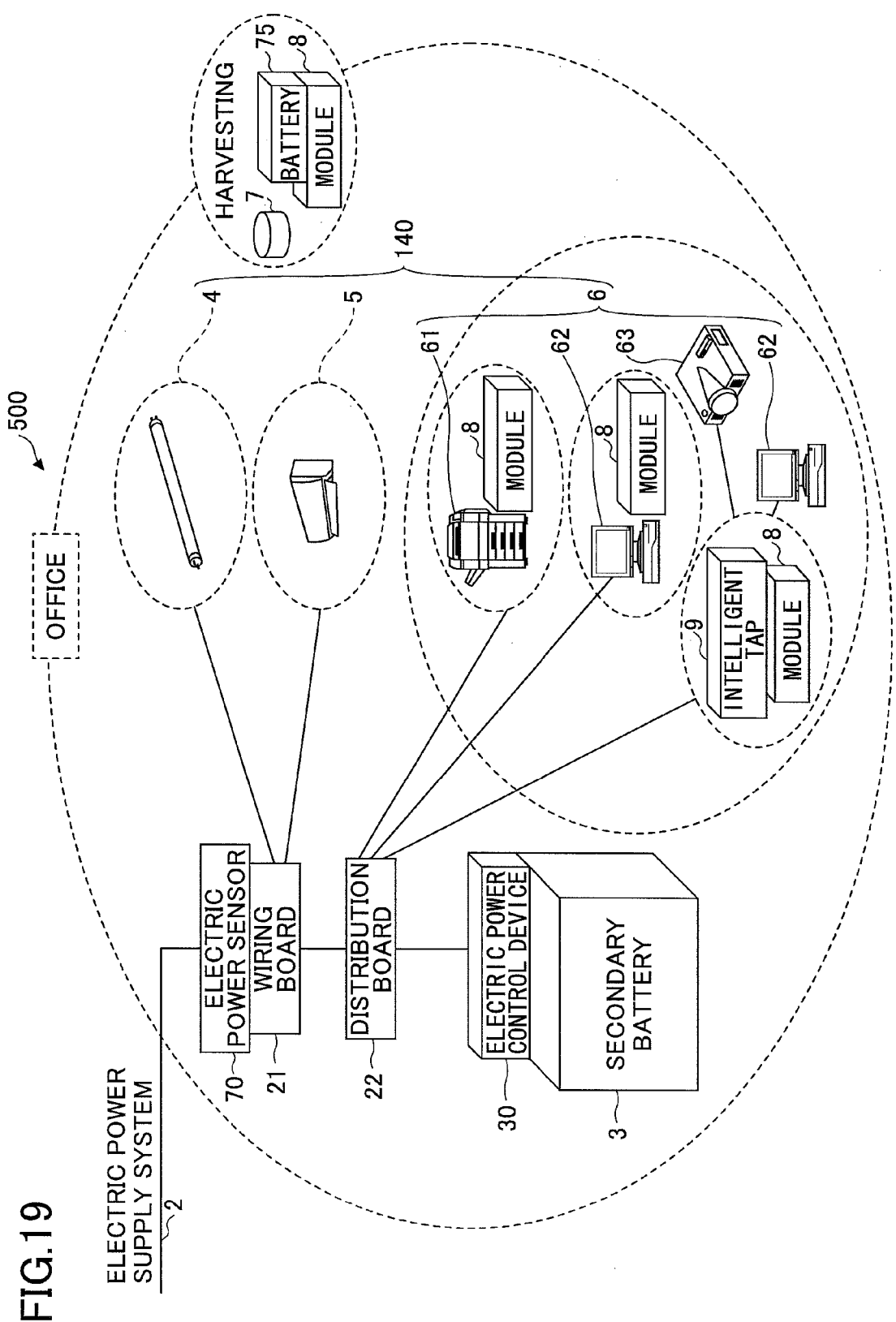
FIG. 19 is an illustration of an outline of an electric power control system according to a fifth embodiment.

A description will now be given, with reference to FIG. 19, of an electric power control system 500 using a secondary battery according to a fifth embodiment of the present invention. The electric power control system 500 according to the fifth embodiment is based on substantially the same technical thought as the fourth embodiment, and a description is given below of differences between the fifth embodiment and the fourth embodiment.

The basic structure of the electric power control system 500 is the same as that of the electric power control system 400 according to the fourth embodiment. Accordingly, the secondary battery 3 and the electric power supply system 2 are installed by being associated with each other. An electric power supply relationship between the electric power supplying part (the electric power supply system 2, the secondary battery 3) and the electric devices 140 is the same as that of the electric power control system 400 according to the fourth embodiment. However, unlike the electric power control system 400 according to the fourth embodiment, the electric power sensor 70 is provided in the wiring board 21 in the electric power control system 500.

If the electric power supply system 2 and the secondary battery 3 are connected to and associated with each other, it is necessary to control the electric power supply from the secondary battery 3 so that a reverse power flow does not occur.

Accordingly, the electric power control system 500 according to the present embodiment suppresses a reverse power flow by controlling the supply of electric power the secondary battery 3 so that an electric power supplied from the electric power supply system 2 is always at least a minimum amount of electric power detectable by the electric power sensor 70 provided to the wiring board 21, which is a reception terminal for receiving electric power supplied from the electric power supply system 2.

That is, the electric power controlling device 30 monitors an amount of electric power detected by the electric power sensor 70 provided to the wiring board 21, and controls the amount of electric power supplied from the electric power supply system 2 does not become zero (stop of supply) in order to prevent a reverse power flow from being generated.

As mentioned above, the electric power control system 500 according to the fifth embodiment enables a more efficient system operation that does not deteriorate a comfort of individuals by preventing a reverse power flow to facilitate association and cooperation of the two power supply systems.

The electric power control process performed in the electric power control system 500 according to the fifth embodiment is the same as the monitoring process of FIGS. 13A and 13B and the secondary battery and electric device controlling process of FIGS. 14A and 14B, and a description thereof will be omitted.

Sixth Embodiment

Figure 20:
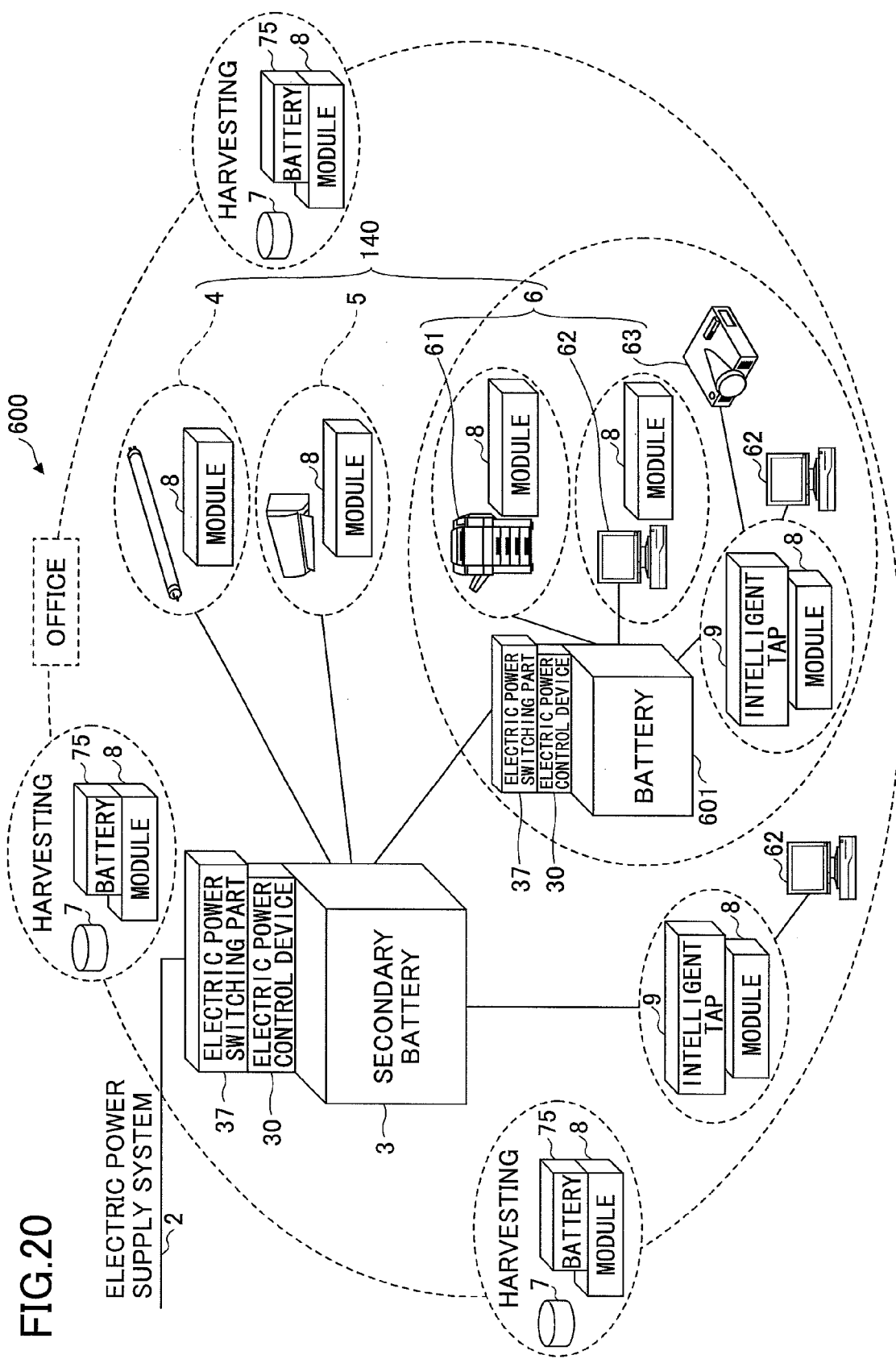
FIG. 20 is an illustration of an outline of an electric power control system according to a sixth embodiment.

A description will now be given, with reference to FIG. 20, of an electric power control system 600 using a secondary battery according to a sixth embodiment of the present invention. The electric power control system 600 according to the sixth embodiment is based on substantially the same technical thought as the first embodiment, and a description is given below of differences between the sixth embodiment and the first embodiment.

The electric power control system 1 according to the first embodiment includes one unit of the single secondary battery 3, but the electric power control system 600 according to the sixth embodiment includes two secondary batteries, that is, the secondary battery 3 and another secondary battery 601. In the electric power control system 600 illustrated in FIG. 20, the secondary battery 3 and the secondary battery 601 are connected and another electric power control device 300 and another electric power switch part 37 are provided to the secondary battery 601.

Additionally, the MFP 61, the personal computer 62, and the personal computer 62 and the projector 63 that are connected to the intelligent tap 9 that are supplied with electric power from the secondary battery 601 can appropriately receive electric power from one of the electric power supply system 2, the secondary battery 3 and the secondary battery 601. Thus, a more efficient system operation can be achieved without deteriorating a comfort of individuals.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitable programmed apparatuses such as a general purpose computer, personal digital assistant (PDA), mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as flexible magnetic disk, hard disc, CD-ROM, magnetic tape device or solid state memory device. The computer software can be provided to the programmable apparatus using any non-transient recording medium for recording processor readable code, such as a flexible magnetic disk, hard disk, CD-ROM, magnetic tape, solid-state memory, etc. The hardware platform encompasses any suitable hardware resources including, for example, a central processing unit (CPU), random access memory (RAM), hard disc drive (HDD), etc. The CPU can be configured by any suitable types and numbers of processors. The RAM can be configured by any suitable volatile or non-volatile memory. The HDD can be configured by any suitable non-volatile memory that can record a large amount of data. The hardware resources may further be equipped with an input device, output device or network device in conformity with the device type. The HDD may be provided outside the apparatus as long as it can be accessed. In such an example, the CPU and RAM like a cache memory of CPU can serve as a physical memory or main memory of the apparatus, whereas the HDD can serve as a secondary memory of the apparatus.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An electric power control system comprising:
   an electrical equipment configured to be supplied with electric power from one of an electric power supply system and a secondary battery;
   an electric power supplying part including the electric power supply system and the secondary battery;
   a plurality of electric devices that receive electric power from the electric power supplying part, the electrical equipment serving as one of the electric devices;
   an environment sensor that detects physical amounts representing a condition of an environment of the electric power control system and outputs detection data; and
   an electric power control device that controls electric power supplied to the electric devices,
   wherein the electrical equipment includes
      a switch circuit that switches a power supply source for supplying electric power to the electrical equipment between the electric power supply system and the secondary battery; and
      a module including
         a controller to control the switch circuit to selectively connect the electrical equipment to one of the electric power supply system and the secondary battery according to a control signal supplied from an external device; and
         an electric power sensor that detects electric power and outputs detection data,
   wherein the electric power control device includes a computer that executes a program to perform an electric power controlling process including:
      collecting the detection data from the electric power sensor and the environment sensor and storing the collected detection data in a detection data storing part;
      storing control condition data in an electric power condition data storing part, the control condition data including information regarding a contract amount of electric power previously set and information regarding an accumulated amount of power consumption;
      storing control device data in a control target device data storing part, the control device data including device identification information for identifying each of the electric devices and priority order identification information for identifying a priority order given to each of the electric devices;
      acquiring a first result from determining which one of the electric power control system and the secondary battery is to supply electric power to the electric devices on an individual device basis based on information including the detection data, the control condition data and the control device data, and also acquiring a second result from determining an amount of electric power to be supplied to the electric devices on an individual device basis or determining whether to stop supplying electric power to the electric devices on an individual device basis; and
      sending an instruction to the module to control the switch circuit in accordance with the first result and the second result, and
   wherein the control condition data stored in the electric power condition data storing part includes a total amount of power consumption determined by a user, information regarding a battery remaining amount value, information regarding a planned power outage, information regarding a demand response, and information regarding an interruption of electric power supply from the electric power supply system.

2. The electric power control system as claimed in claim 1, wherein the electric power control device includes a display device that displays information regarding electric power supply and an input device that is used to update the control condition data and change the priority order given to each of the electric devices, and wherein the electric power controlling device computes a usable time for the electric devices currently being operated if the electric devices are continuously used by electric power supplied from the secondary battery, and displays the computed usable time on the display device.

3. The electric power control system as claimed in claim 1, wherein the control target device data stored in the control target device data storing part includes information regarding which one of the electric power supply system and the secondary battery is connectable to each of the electric devices on an individual device basis.

4. The electric power control system as claimed in claim 1, wherein the electric power supply system includes a wiring board that serves as an electric power receiving terminal and provided with an electric power sensor, and the electric power supply device controls the supply of electric power to the electric devices using a detection signal output from the electric power signal provided in the wiring board.

5. The electric power control system as claimed in claim 1, wherein the electric power supply system includes a wiring board and/or a distribution board serving as an electric power receiving terminal, and when the electric power supply system and the secondary battery is connected in association with each other, the electric power supply device controls an amount of electric power supplied from the secondary battery to be smaller than or equal to an amount of electric power consumed by the electric devices using the electric power of the secondary battery.

6. The electric power control system as claimed in claim 1, wherein the electric power supply system includes a wiring board that serves as an electric power receiving terminal and provided with an electric power sensor, and when the electric power supply system and the secondary battery is connected in association with each other, the electric power control device monitors an amount of electric power detected by the electric power sensor provided in the wiring board, and controls the electric power supplied from the secondary battery so that the electric power supply from the electric power supply system does not stop.

7. The electric power control system as claimed in claim 1, wherein the module further includes:
 an electric power sensor that detects electric power and outputs detection data; and
 a communication interface that transmits the detection data output from the electric power sensor to an external control device and receives information regarding the controlling process from the external control device.

8. The electric power control system as claimed in claim 7, wherein the electrical equipment further includes a plurality of receptacles each of which is connectable to a power supply plug of an electric device so that the electrical equipment serves as a power strip.

9. The electric power control system as claimed in claim 8, wherein each of the receptacles is provided with an operating part that is operated by a user to input priority information to be set to the electric device connected to the corresponding one of the receptacles.

10. The electric power control system as claimed in claim 7, wherein the electrical equipment further includes a lamp holder in which the module is incorporated and a LED lamp attached to the lamp holder so that the electrical equipment serves as an LED lamp.

11. The electric power control system as claimed in claim 10, wherein a battery for emergency is incorporated in the lamp holder.

* * * * *